United States Patent
Kang

(10) Patent No.: US 10,064,036 B2
(45) Date of Patent: Aug. 28, 2018

(54) COMMUNICATION SERVICE IN COMMUNICATION MODES

(71) Applicant: Samsung Electronics Co., Ltd., Gyeonggi-do (KR)

(72) Inventor: Hyuk Kang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/255,143

(22) Filed: Apr. 17, 2014

(65) Prior Publication Data
US 2014/0323048 A1   Oct. 30, 2014

(30) Foreign Application Priority Data

Apr. 26, 2013   (KR) .................. 10-2013-0046671

(51) Int. Cl.
*H04W 4/00* (2018.01)
*H04W 52/02* (2009.01)
*H04B 7/00* (2006.01)
*H04W 4/80* (2018.01)
*H04W 76/02* (2009.01)
*H04W 76/14* (2018.01)

(52) U.S. Cl.
CPC .............. *H04W 4/80* (2018.02); *H04W 4/008* (2013.01); *H04W 76/023* (2013.01); *H04W 76/14* (2018.02)

(58) Field of Classification Search
USPC ....................................... 455/41.2
See application file for complete search history.

(56) References Cited

U.S. PATENT DOCUMENTS

| | | | | |
|---|---|---|---|---|
| 5,701,427 A | * | 12/1997 | Lathrop | H04L 12/1895 709/203 |
| 8,656,064 B2 | * | 2/2014 | Masuda | H04M 1/7253 710/1 |
| 8,965,284 B2 | * | 2/2015 | Honkanen | G01S 3/46 455/41.1 |
| 2002/0147819 A1 | | 10/2002 | Miyakoshi et al. | |

(Continued)

FOREIGN PATENT DOCUMENTS

CN   102210173 A   10/2011
CN   102422268 A   4/2012

(Continued)

OTHER PUBLICATIONS

European Search Report, dated Nov. 4, 2016.
Chinese Search Report dated Feb. 8, 2018.

*Primary Examiner* — Edward Urban
*Assistant Examiner* — Ralph H Justus
(74) *Attorney, Agent, or Firm* — Cha & Reiter, LLC

(57) ABSTRACT

Disclosed herein are a method and apparatus for establishing communication between a plurality of devices. A first advertising packet comprising an identifier of the first electronic device is broadcast to at least one other device in a first radio communication mode. At least one responding advertising packet request is received from the at least one other device. A communication link in a second radio communication mode is established with a device from which a responding advertising packet was received.

15 Claims, 18 Drawing Sheets

(56) References Cited

U.S. PATENT DOCUMENTS

| | | | |
|---|---|---|---|
| 2005/0090242 A1* | 4/2005 | Kotzin | H04W 84/08 455/422.1 |
| 2008/0003946 A1* | 1/2008 | Lee | H04W 8/005 455/41.2 |
| 2008/0220878 A1 | 9/2008 | Michaelis | |
| 2008/0311852 A1* | 12/2008 | Hansen | H04W 88/06 455/41.2 |
| 2010/0128695 A1 | 5/2010 | Nagaraja | |
| 2010/0136907 A1* | 6/2010 | Zhou | H04B 1/3805 455/41.2 |
| 2010/0235523 A1 | 9/2010 | Garcia et al. | |
| 2011/0021142 A1* | 1/2011 | Desai | H04W 8/005 455/41.2 |
| 2011/0107117 A1 | 5/2011 | Jung et al. | |
| 2011/0263201 A1* | 10/2011 | Bukurak | H04W 4/00 455/41.2 |
| 2012/0052802 A1* | 3/2012 | Kasslin | H04W 48/12 455/41.2 |
| 2012/0195387 A1* | 8/2012 | Masuda | H04M 1/7253 375/259 |
| 2012/0214417 A1* | 8/2012 | Woo | G06F 1/3209 455/41.2 |
| 2012/0224509 A1* | 9/2012 | Nagaraja | H04W 76/023 370/255 |
| 2012/0295541 A1* | 11/2012 | Kwon | H04W 76/023 455/41.1 |
| 2012/0309309 A1* | 12/2012 | Cho | H04W 76/023 455/41.1 |
| 2013/0217332 A1* | 8/2013 | Altman | H04H 60/90 455/41.2 |
| 2013/0325952 A1* | 12/2013 | Draznin | H04N 21/4126 709/204 |
| 2013/0331031 A1* | 12/2013 | Palin | H04W 52/0245 455/41.2 |
| 2014/0012913 A1* | 1/2014 | Varoglu | H04L 41/0806 709/204 |
| 2014/0073246 A1* | 3/2014 | Sip | H04W 76/025 455/41.2 |
| 2015/0126117 A1* | 5/2015 | Wong | H04W 52/0229 455/41.2 |

FOREIGN PATENT DOCUMENTS

| | | |
|---|---|---|
| JP | 2010-288208 A | 12/2010 |
| KR | 10-2011-0049121 A | 5/2011 |
| WO | 2013/035999 A1 | 3/2013 |
| WO | 2013/036092 A2 | 3/2013 |

\* cited by examiner

FIG. 4

| AD Type | Byte | USAGE | EXAMPLE |
|---|---|---|---|
| TX Power Level | 1 | DISTANCE (Signal Strength) MEASUREMENT pathloss=TXPL-Adv_RSSI | TX Power level = + 4(dBm) RSSI on Advpacket = − 60(dBm) passloss = + 65dB |
| Manufacturer Specific Data  <\<Protocol\>> | 4 | Company Identifier Code & Protocol Identifier Code | (0x0075)Samsung Electronics (0x0201)SSSP1.1 |
| Manufacturer Specific Data  <\<Capability\>> | 3 | Capability State (24bit bit-mask) | <\<Communication Bitmasks\>> (01) Bluetooth BR/EDR (02) Bluetooth AMP (03) Bluetooth LE (04) WiFi (05) WiFi Direct (06) WiFi Display (07) DLNA (All-Share) (08) NFC, RFID (09) ZigBee, RF4CE (10) Ant, Ant+ (11) Proprietary 2.4Ghz (12) Sub-1Ghz (13) Bonjour <\<Sensor Bitmasks\>> (14) GPS (15) Accelerometer (16) Gyroscope (17) Geomagnetic (18) Pressure (19) Temperature (20) Humidity (21~24) Reserved  wx) 0x0000FF (01~08 Supported) |
| Manufacturer Specific Data  <\<others\>> | . . . | . . . | . . . |

COMMUNICATION SERVICE IN COMMUNICATION MODES

CLAIM OF PRIORITY

This application claims the benefit under 35 U.S.C. § 119(a) of a Korean patent application filed on Apr. 26, 2013 in the Korean intellectual property office and assigned serial No. 10-2013-0046671, the entire disclosure of which is hereby incorporated by reference.

TECHNICAL FIELD

The present disclosure relates to a communication service method and apparatus and, in particular, to a method and apparatus for providing communication service among a plurality of devices located within short distances.

BACKGROUND

With the advent of convergence technology, research related to inter-device communication has been steadily on the rise. Such research is also focused on short distance communication between electronic devices. For example, it is commonplace today for users to meet and exchange information using their portable devices. In this instance, each portable device may be required to have knowledge of the other device's communication mechanism and input configuration. Therefore, some scenarios may require a complex multi-step channel establishment procedure.

Establishing inter-device communication without certain pre-negotiation steps may be very difficult. By way of example, assuming a specific communication protocol connection is required for a certain communication service, a user may have to activate the corresponding protocol function in their device to establish the communication channel. However, users are likely to deactivate specific protocol functions, since keeping these protocol functions active could deplete the device's battery. Accordingly, the user has to negotiate with the peer user directly and input commands or settings to activate the corresponding protocol function.

If the communication protocol function is constantly active, this may allow users to automatically establish a communication channel with another device without manual intervention. However, while the communication protocol function is in standby mode, battery consumption increases and battery life shortens.

SUMMARY

In view of the foregoing, disclosed herein are a method and apparatus for inter-device communication. The techniques herein provide an inter-device communication service capable of efficient power consumption while improving the quality of the communication service. Furthermore, the technology disclosed in the present disclosure provides an inter-device communication service that facilitates communication between devices using various communication protocols.

In accordance with one aspect of the present disclosure, a communication service method may include: broadcasting, in a first radio communication mode, a first advertising packet comprising an identifier of a first electronic device and communication service information; receiving, in the first radio communication mode, at least one responding advertising packet request from at least one other electronic device located within proximity of the first electronic device, the at least one responding advertising packet being a request to join the communication service; and establishing a communication link in a second radio communication mode with at least one other electronic device from which a responding advertising packet was received, when selection of the at least one other electronic device is detected via a user interface, the first communication mode being of a lower power than the second communication mode.

In one example, establishing the communication link in the second radio communication mode may comprise negotiating, via a data channel in the first radio communication mode, the second radio communication mode for use in establishing the communication link with the at least one other electronic device.

In a further example, the data channel in the first radio communication mode may be a secure communication link in the first radio communication mode established between the at least one other electronic device and the first electronic device.

In yet a further example, establishing the communication link in the second radio communication mode may comprise transmitting a communication connection request message to the at least one other electronic device in the second radio communication mode.

In another aspect, the first advertising packet may comprise radio communication capability data associated with the first electronic device, and the at least one responding advertising packet comprises information associated with the second radio communication mode selected by the at least one other electronic device.

In a further aspect, the radio communication capability data may further comprise information associated with a dual mode for operating a communication link in the first radio communication mode and the communication link in the second radio communication mode simultaneously.

In yet a further aspect, the first advertising packet may comprise a field associated with the second radio communication mode and a Medium Access Control (MAC) address field based on the second radio communication mode.

In a further example, establishing the communication link in the second radio communication mode may comprise maintaining a communication link in the first radio communication mode with the at least one other electronic device in conjunction with the communication link in the second radio communication mode.

In yet another example, the communication service may be maintained using the communication link in the first radio communication mode such that maintaining the communication service comprises recovering the communication link in the second radio communication mode using the communication link in the first radio communication mode.

In yet a further aspect, maintaining the communication service may comprise switching from the second radio communication mode to a third radio communication mode using the communication link in the first radio communication mode to maintain the communication service in the third radio communication mode.

In a further example, the first radio communication mode may be a wave communication mode and a Bluetooth Low Energy (BLE) mode, and the second radio communication mode may be a Bluetooth Classic mode, a wireless fidelity (Wi-Fi) mode, or a Wi-Fi Direct mode.

In yet another example, the first advertising packet may comprise a service identifier field indicating the communication service and a service state field indicating a state of the communication service.

In another aspect, the first advertising packet may comprise a company identifier indicating at least one of a manufacturer of the first electronic device and a communication service provider. The company identifier may be used for determining which devices can receive the first advertising packet.

In a further example, the first advertising packet may comprises a transmission power information for use in calculating pathloss along with Receiver Signal Strength Indicator (RSSI) of the first advertising packet which is measured by the at least one other electronic device.

In accordance with another aspect of the present disclosure, an electronic device is provided. The electronic device may include a control unit to broadcast, in a first radio communication mode, a first advertising packet comprising an identifier of a first electronic device and communication service information; receive, in the first radio communication mode, at least one responding advertising packet request from at least one other electronic device located within proximity of the first electronic device, the at least one responding advertising packet being a request to join the communication service; and establish a communication link in a second radio communication mode with at least one other device from which a responding advertising packet was received, when selection of the at least one other electronic device is detected via a user interface, the first communication mode being of a lower power than the second communication mode.

In accordance with another aspect of the present disclosure, a further method is provided. The method may comprise: broadcasting, in a Bluetooth Low Energy (BLE) communication mode, a first advertising packet comprising an identifier of a first electronic device, communication service information, and Radio Frequency (RF) communication mode information; receiving, in a BLE communication mode, at least one responding advertising packet request from at least one other electronic device located within proximity of the first electronic device, the at least one responding advertising packet being a request to join the communication service; and establishing a communication link in an RF communication mode different from the BLE communication mode with at least one other device from which a responding advertising packet was received, when selection of the at least one other electronic device is detected via a user interface, the BLE communication mode being of a lower power than the RF communication mode.

In accordance with yet another aspect of the present disclosure, a further electronic device is provided. The electronic device may comprise a control unit to broadcast, in a Bluetooth Low Energy (BLE) communication mode, a first advertising packet comprising an identifier of a first electronic device, communication service information, and Radio Frequency (RF) communication mode information; receive, in a BLE communication mode, at least one responding advertising packet request from at least one other electronic device located within proximity of the first electronic device, the at least one responding advertising packet being a request to join the communication service; and establish a communication link in an RF communication mode different from the BLE communication mode with at least one other device from which a responding advertising packet was received, when selection of the at least one other electronic device is detected via a user interface, the BLE communication mode being of a lower power than the RF communication mode.

In accordance with another example of the present disclosure, a further method is provided. The method may include outputting a first sound wave comprising an identifier of a first electronic device, communication service information, and Radio Frequency (RF) communication mode information; receiving at least one responding sound wave requesting to join the communication service which is transmitted by at least one other electronic device located within proximity of the first electronic device; and establishing a communication link in an RF communication mode with at least one other device from which a responding sound wave was received, the at least one other electronic device being selected via a user interface.

In a further example of the present disclosure, a further electronic device is disclosed. The electronic device may comprise a control unit to: output a first sound wave comprising an identifier of a first electronic device, communication service information, and Radio Frequency (RF) communication mode information; receive at least one responding sound wave requesting to join the communication service which is transmitted by at least one other electronic device located within proximity of the first electronic device; and establish a communication link in an RF communication mode with at least one other device from which a responding sound wave was received, the at least one other electronic device being selected via a user interface.

In accordance with a further aspect of the present disclosure, a method may comprise: receiving a first advertising packet comprising an identifier of a first electronic device, communication service information, and radio capability information, the first advertising packet being broadcast in a first radio communication mode; displaying a user interface allowing for designating whether to join in the communication service; transmitting a second advertising packet requesting to join the communication service in the first radio communication mode to the first electronic device, when an input permitting to join the service is detected; and establishing a communication link in a second radio communication mode with the first electronic device in accordance with the radio capability information.

In another example of the present disclosure, an electronic device may comprise a control unit to: receive a first advertising packet comprising an identifier of a first electronic device, communication service information, and radio capability information, the first advertising packet being broadcast in a first radio communication mode; transmit a second advertising packet requesting to join the communication service in the first radio communication mode to the first electronic device, when an input permitting to join the service is detected; and establish a communication link in a second radio communication mode with the first electronic device in accordance with the radio capability information.

BRIEF DESCRIPTION OF THE DRAWINGS

FIG. 4 is a diagram illustrating an example data of AD Type and AD Data of the data structure depicted in FIG. 17;

DETAILED DESCRIPTION

A description is made of a method of implementing and utilizing the apparatus of the present disclosure. The term "unit" or "module" denotes the function block responsible for a certain function or processing certain operation and may be implemented in hardware, software, or a combination of the two.

The example system of the present disclosure may include electronic devices that may be configured in various ways. The electronic devices in one example may include: a mobile terminal, computer, TV, electronic appliance, kiosk, etc. The electronic device may include a first communication unit, a second communication unit, a user interface unit, a control unit, etc. The mobile terminal may include, but are not limited to, a mobile phone, smartphone, laptop computer, tablet Personal Computer (PC), electronic book (e-book) terminal, digital broadcast terminal, Personal Digital Assistant), Portable Multimedia Player (PMP), navigator, wearable terminal, accessories, etc.

Examples herein are described with reference to the accompanying drawings in detail in order for those skilled in the art to implement the devices and methods of the present disclosure. The techniques of the present disclosure may be implemented in variety of ways and are not limited to the environments illustrated herein. Elements not related to the present disclosure may be omitted, and the same reference numbers are used throughout the drawings to refer to the same or like parts.

Figure 1:
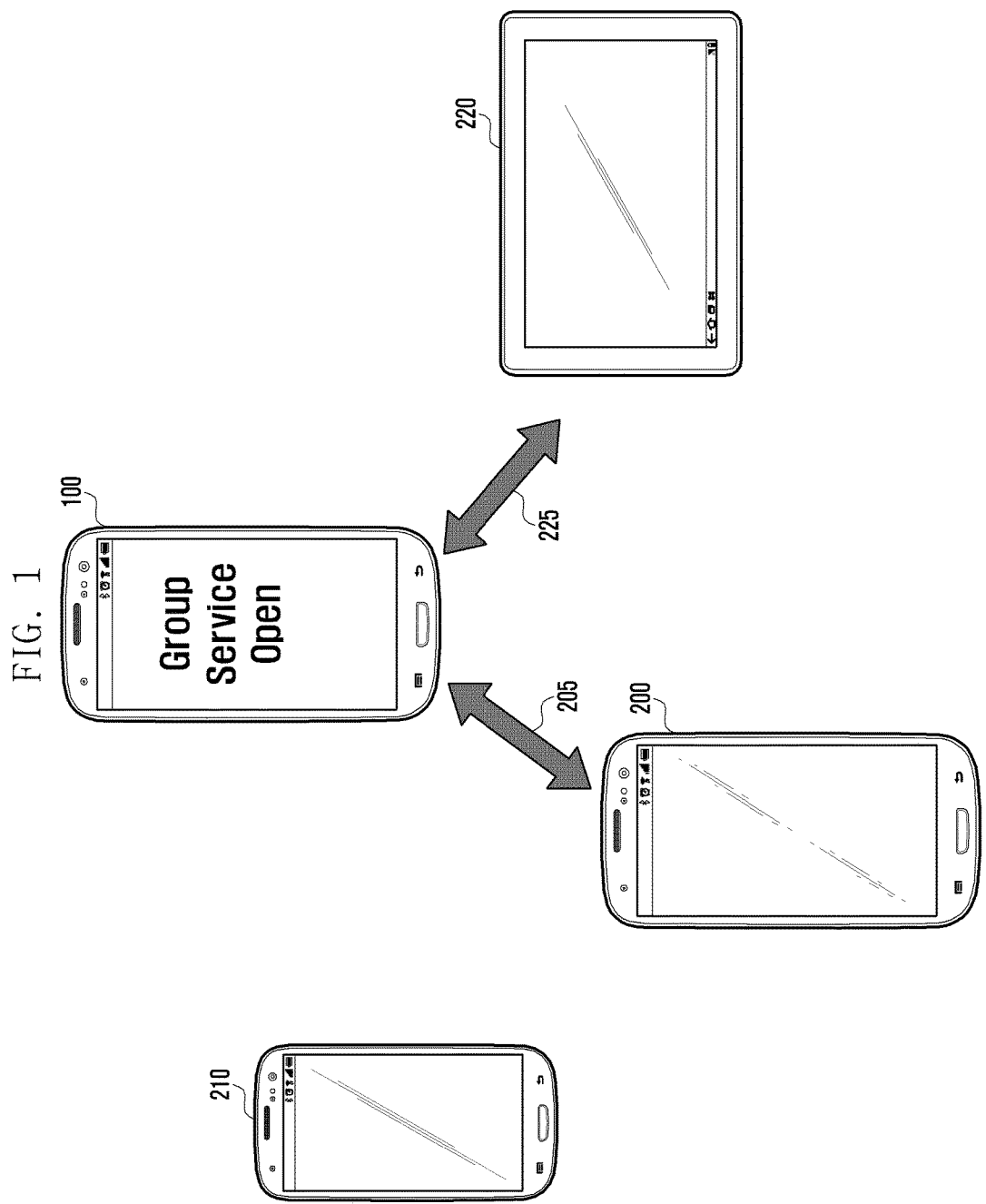
FIG. 1 is a working example of communication among electronic devices in accordance with aspects of the present disclosure.

FIG. 1 is a working example in accordance with aspects of the present disclosure. The user of the first electronic device 100 may intend to use a communication service through the communication link established with at least one other device. Here, the communication service may include text, voice, and video communication services and content associated with education, entertainment, social networking, etc. For example, the communication service may be a chat service or a gaming service in which at least two users participate.

The first electronic device 100 may provide a user interface for establishing a communication service. If a communication service initiation request is input through the user interface of first electronic device 100, electronic device 100 may broadcast a first advertising packet comprising the identifier of the first electronic device 100 and information indicating an open communication service in the first radio communication mode.

The first radio communication mode may be used for broadcasting information necessary for establishing a D2D communication link and receiving the advertising packets broadcast by other electronic devices. For this purpose, the communication units of the first radio communication mode of first electronic device 100 and at least one other electronic device 200, 210, and 220 within proximity of first electronic device 100 are in an active state. Since the electronic device may have to transmit a signal periodically, continuously monitor in order to detect a response to the transmitted signal, or remain in the active state for receiving a signal transmitted at a certain time to establish a D2D communication link, the first radio communication mode may be a low power communication mode to preserve battery life. For example, the first radio communication mode may be the Bluetooth Low Energy (BLE) communication mode. The BLE communication mode is capable of transmitting signal at low transmit power and abides by a communication standard capable of discovering neighboring devices rapidly. The first radio communication mode may be implemented with other low power short range communication technologies (e.g. Bluetooth Classic, ZigBee, Infrared Data Association (IrDA), Radio Frequency Identification (RFID), and Near Field Communication (NFC).

In order to establish a D2D communication link between various electronic devices, the first radio communication mode may be used as a universal communication mode. For example, the first radio communication mode may include a sound wave communication mode. Typically, the sound wave communication mode may operate with the speaker, microphone, sound circuit, and processor other than Radio Frequency (RF) communication mode. If there is no second radio communication mode for the communication service or there are several second radio communication mode candidates, the device may use the sound wave communication mode as the first radio communication mode universally for simply triggering the D2D communication link.

In the example of FIG. 1, there are three other electronic devices 200, 210, and 220 within a predetermined radius around first electronic device 100. In this example, the at least one other electronic device may include electronic device 200, electronic device 210, and electronic device 220.

Each of the electronic devices 200, 210, and 220 may receive a first advertising packet comprising the identifier of the first electronic device 100 and the information indicating that a communication service is open.

Each of the electronic devices 200, 210, and 220 provides the user with a user interface that allows the user to participate in the communication service. Here, it may be assumed that the electronic devices 200, 210, and 220 join the communication service in response to user inputs. If the devices join the communication service, each electronic device 200, 210, and 220 transmit a second advertising packet requesting to join. The first electronic device 100 may receive at least one responding advertising packet requesting to join the communication service from at least one of the at least one other electronic device. These advertising packets received from the at least one other electronic device may be in a first communication mode.

The first electronic device 100 may be provided with a user interface for selecting at least one of the electronic devices 200, 210, and 220 to join in the communication service. By way of example, the electronic device 200 and the electronic device 220 are selected as the target electronic devices in response to the user's input.

The first electronic device 100 may establish a second radio communication mode to link with the target electronic devices 200 and 220. Here, the second radio communication mode may be used for establishing the communication link. That is, the first radio communication mode may be used for triggering a D2D communication link. The first communication mode may be of a low power and may have universal features, while the second radio communication mode may be used for establishing a communication link that provides the communication service. The first communication mode may be of a lower power than the second communication mode. Furthermore, the second communication mode may have a higher communication quality such as a higher data rate and Quality of Service (QoS). The second radio communication mode may be the communication mode preconfigured depending on the communication service. For example, the predetermined communication mode may be Wi-Fi Direct or Bluetooth Classic mode. The second radio communication mode may also be determined through notification to the peer electronic device in the first radio communication mode. The second radio communication mode may be determined by negotiating the first radio communication mode data channel in view of the RF capability of the communication mode between the electronic devices.

If at least one target electronic device has been selected or if the second radio communication mode has been negotiated successfully, the first radio communication mode may be deactivated before establishing the second radio communication mode link. The first wireless communication mode may be constantly active in parallel with the second radio communication mode for dual mode operation. This may allow the first wireless communication mode to control the second radio communication mode service.

The second radio communication mode also may be inactive before at least one target electronic device is selected or before negotiation of the second radio communication mode is concluded. Even when the power consumption of the second wireless communication mode is high due to the high quality of the communication service, the second radio communication mode may be optimized, resulting in improved energy utilization efficiency.

The first electronic device 100 and the at least one other electronic device may join in the communication service through the second radio communication mode link.

Figure 2:
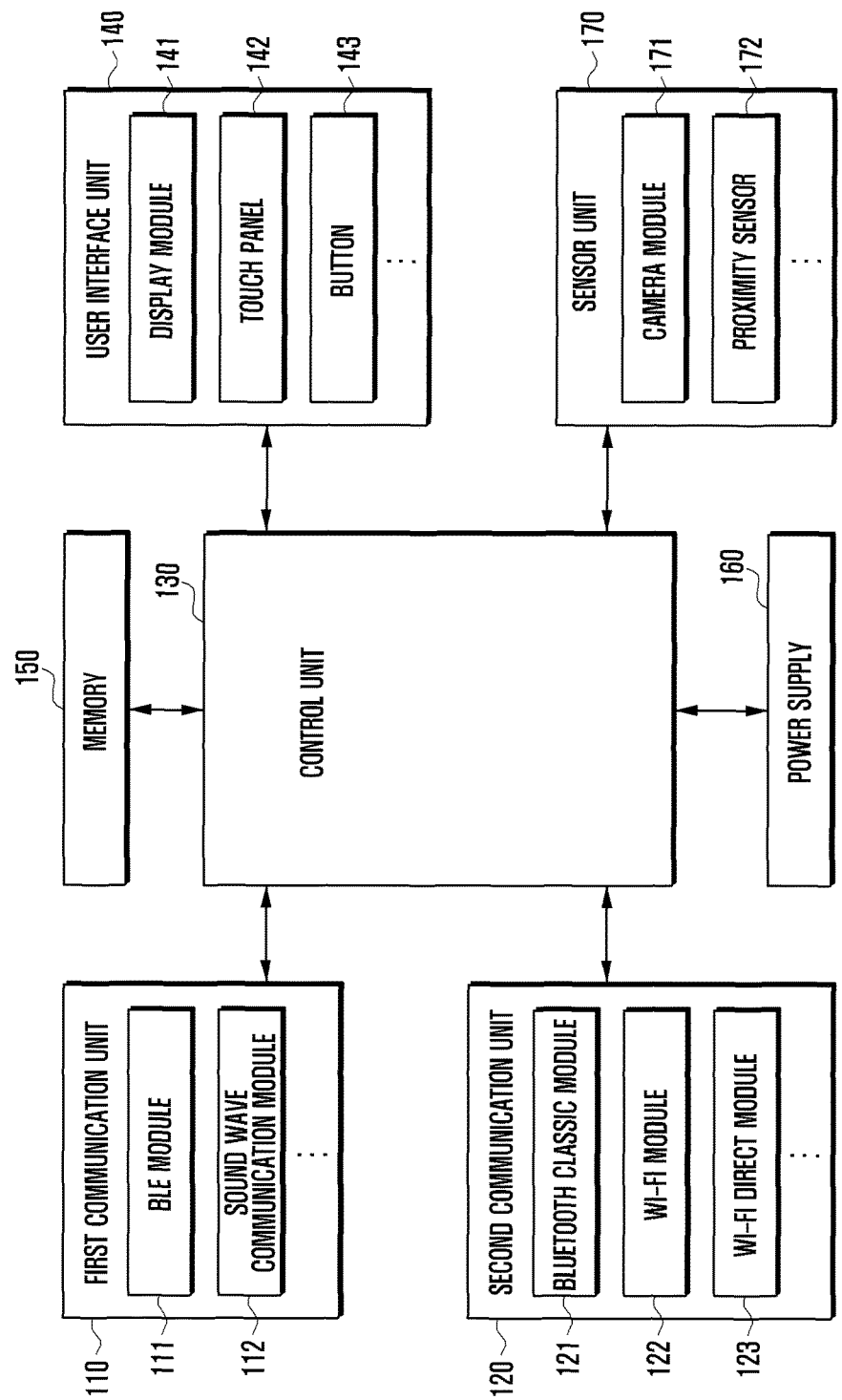
FIG. 2 is block diagram illustrating an example configuration of an electronic device in accordance with aspects of the present disclosure.

FIG. 2 is block diagram illustrating an example configuration of the first electronic device 100 in accordance with aspects of the present disclosure. Thus, it is understood that the components of the device shown in FIG. 2 are just illustrative and that alternate configurations may also be implemented.

The first electronic device 100 includes a first communication unit 110, a second communication unit 120, a control unit 130, and a user interface unit 140.

The first communication unit 110 may broadcast the first advertising packet comprising the identifier of the first electronic device 100 and communication service information regarding the first radio communication mode. The first communication unit 110 may receive at least one responding advertising packet requesting to join the communication service. These other advertising packets may be transmitted by at least one other electronic device while in a first radio communication mode. The first communication unit 110 may include a BLE module 111 and a sound wave communication module 112.

The BLE module 111 supports BLE communication mode. The BLE communication mode may abide by the Bluetooth 4.0 standard specification. Although the BLE communication mode specification is modified or altered in Bluetooth 4.0 or later versions, the BLE communication mode may be implemented to abide by the modified or altered specifications. The BLE communication mode operates in Industrial Scientific Medical (ISM) frequency band with 40 RF channels spaced 2 MHz apart. The RF channels of BLE are classified into 3 advertisement channels and 40 data channels. The Gaussian Frequency Shift Keying (GFSK) modulation is applied to all the physical channels.

The BLE communication mode packet consists of a preamble (1 octet), Access Address (4 octets), Packet Data Unit (PDU, 2 to 39 octets), and Cyclic Redundancy Check (CRC, 3 octets). The advertising packet PDU includes a 16-bit header and up to 31-byte payload. That is, the payload of the advertising packet is variable between0 6 and 37 octets. The header of the advertising packet may include a PDU type indicating specific advertising event designated in accordance with the usage purpose. The payload of the advertising packet includes 6-octet advertiser address field and 0~31-octet data field. The advertiser address field may include a public device address and random device address of the advertiser designated by the PDU header. The public device address may be a universal Local Area Network (LAN) MAC address of Institute of Electrical and Electronics Engineers (IEEE) 802 standard. The public device address includes a company_assigned field of 24 Least Significant Bits (LSBs) and a company_id field of 24 Most Significant Bits (MSBs). The random access address includes a hash field of 24 LSBs and a random field of 24 MSBs.

In one example, the advertiser address field included in the payload may be used as the identifier of the electronic device as the advertiser. In accordance with the PDU header indication, the payload may include the address of an initiator or a scanner. Here, the initiator may be the device requesting for establishing a communication channel with the advertiser broadcasting the advertising packet. However, it is noted that the electronic device as a target of the initiator may be changed depending on the device transmitting the advertising packet or the packet transmission situation. For example, in the advertise direction indication (ADV_DI- RECT_IND) PDU, the advertiser address field may indicate the identifier of the electronic device transmitting the corresponding PDU, and the initiator address field the identifier of the electronic device receiving the corresponding PDU. The scanner may be the device which receives the signal broadcast on the advertising channel without intention of connecting to the advertising device.

In another example, the first advertising packet may be an ADV_IND PDU which may include the advertiser address field indicating the identifier of the first electronic device 100. The second advertising packet may be an ADV_DIRCT_IND PDU which may include the advertiser address field indicating the identifier of at least one other electronic device and the initiator address field indicating the identifier of the first electronic device 100. It will be understood by those skilled in the art that the second advertising packet may be implemented with ADV_IND PDU, Scan Request (SCAN_REQ) PDU, Connection Request (CONNECT_REQ) PDU, or other PDU in new format provided by the manufacturer or communication service provider instead of ADV_DIRECT_IND PDU.

Figure 3:
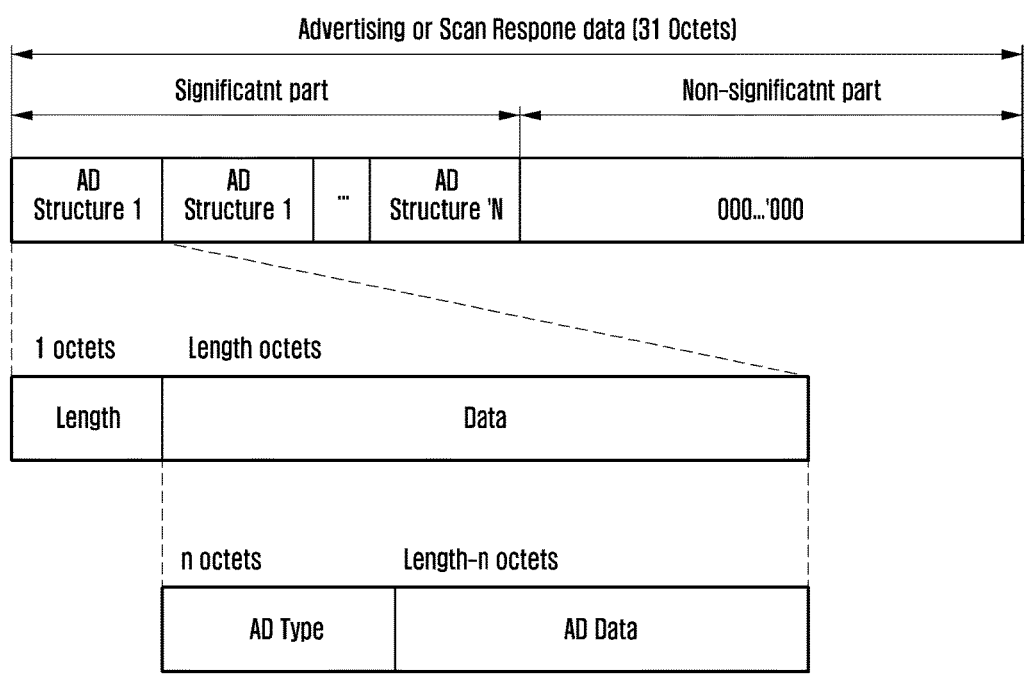
FIG. 3 is a diagram illustrating an example format of advertising packet PDU payload in accordance with aspects of the present disclosure.

FIG. 3 is a diagram illustrating an example format of advertising packet PDU payload including data fields in accordance with aspects of the present disclosure. The data field having a length of up to 31 octets may include AD structure 1 to AD structure N. Each AD data structure includes a data filed and a length field indicating the length of the data field, the data field includes an AD Type field and an AD Data field. The AD type is the information indicating the type of data following it using a predetermined code. The code may be determined in accordance with the communication standard or by the manufacturer or the communication service provider. The AD Data is the data of the type indicated by the AD Type and used for indicating the data value of the type corresponding to the AD Type. The data value may be determined in accordance with the communication standard or by the manufacturer or the communication service provider.

Figure 17:
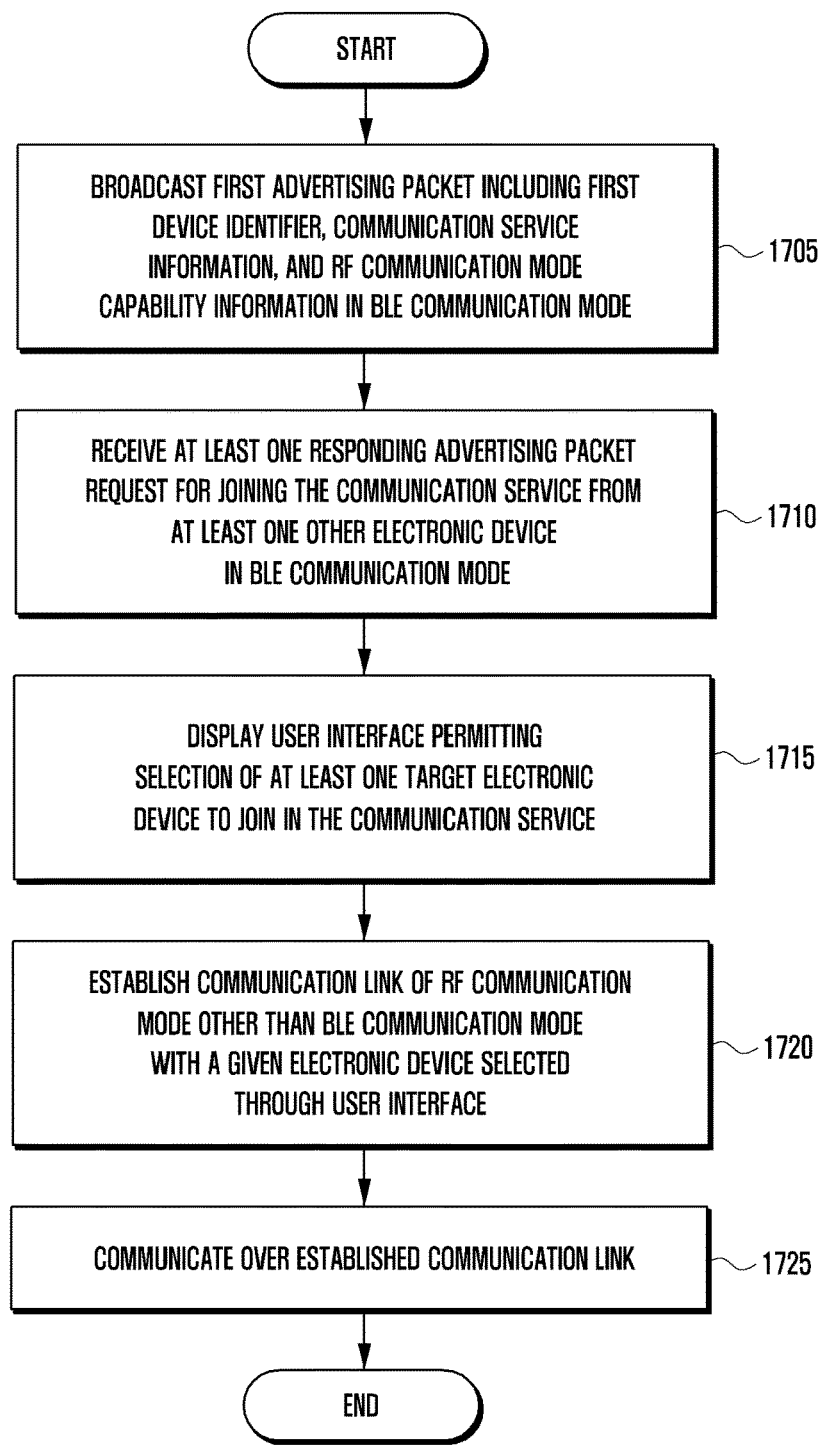
FIG. 17 is a flowchart illustrating an example communication service method in accordance with aspects of the present disclosure.

FIG. 4 is a diagram illustrating example data of AD Type and AD Data of the data structure of FIG. 17. The data structure of the first advertising packet may include the information indicating the communication service establishment (not shown). For example, the data structure of the first advertising packet may include AD Type field informing that the data is of the communication service identifier and an AD Data field indicating the service identifier. Also, the data structure of the first advertising packet may include the AD Type field information that the data is the communication service status and the AD Data field indicating the service status in addition to the service identifier field. At this time, the service status field may indicate the opening of the communication service. The service status field may indicate one of opening, joining, stopping, terminating, restarting, and recovering the communication service.

The data structure of the first advertising packet may include the transmission power information as shown in FIG. 4. For example, the data structure of the first advertising packet may include the AD Type field indicating that the data is of the transmission power level and the AD Data field indicating the value of the transmission power level. Each second electronic device may calculate the pathloss from the first electronic device 100 and the other corresponding electronic device using the Received Signal Strength Indicator (RSSI) and the transmission power information on the first advertising packet. If the pathloss is greater than a predetermined value, the second electronic device determines that it's unsuitable for the communication service and does not request to join in the communication service. If the pathloss is equal to or less than the predeterminate value, the second electronic device determines that it's suitable for the communication service and requests to join the communication service. The second electronic device may provide a user interface in order for the user to select whether to join the communication service before requesting to join in the communication service.

As shown in FIG. 4, the data structure of the first advertising packet may include a company identifier indicating at least one of the manufacturer of the first electronic device 100 and the communication service provider. That is, in the case that the formats of the AD Type and AD Data are designated by a certain company, the corresponding company identifier is included. The at least one other electronic device may be capable of determining whether the protocol on the data structure format of the specific company and the message exchange procedure for communication service is supportable based on the company identifier. The data structure also may include a protocol identifier indicating the protocol version of the specific company (or protocol type) along with the company identifier. If it is determined that the protocol is not supportable based on the company identifier or the protocol identifier, the second electronic device may skip decoding or analyzing the corresponding protocol-related message or fields. If the second electronic device does not support a certain protocol, it may be impossible to perform the communication service proposed in the present disclosure. For example, if the service identifier (or service identifier field) or service status (or service status field) is included in the first advertising packet in accordance with the protocol of the specific company, the second electronic device which does not support the corresponding protocol cannot decode the corresponding content. In this way, the company identifier or protocol identifier may be used for determining which devices can receive the first advertising packet. The at least one other electronic device may check the company identifier and the protocol identifier included in the first advertising packet and, if it supports the protocol of the communication service, joins the communication service execution procedure.

The data structure of the first advertising packet may include capability information of the first electronic device 100 as shown in FIG. 4. The capability information or data may comprise information associated with the first radio communication mode and data associated with the second radio communication mode. The data associated with the first radio communication mode may be used for triggering the communication between devices and the information associated with the second radio communication mode may correspond to the communication link providing the communication service. The capability information also may include the information on the frequency band for the radio communication mode and sensor information as well as the radio communication mode. As shown in FIG. 4, the capability information format may be determined based on the protocol of a specific company, it is possible to reduce the data field size occupied by the information value using a bit mask. As shown in FIG. 4, the information on the AD Data of 0x0000FF corresponding to the AD Type of Manufacturer Specific Data<<Capability>> is broadcast in the first advertising packet, at least one other electronic device is notified. The at least one other electronic device may be in the communication range in which the radio communication functions of (01) Bluetooth BR/EDR, (02) Bluetooth AMP,

(03) Bluetooth LE(BLE), (04) Wi-Fi, (05) Wi-Fi Direct, (06) Wi-Fi Display, (07) DLNA (All-Share), (08) NFC, and RFID are supportable.

In another example, the data structure of the first advertising packet may include the Medium Access Control (MAC) address field corresponding to the second wireless communication mode indicated by the capability information. The MAC address field of the second radio communication mode is not included in the first advertising packet but transmitted from the first electronic device 100 to the second electronic device through a secured data channel of the first communication mode in the second radio communication mode negotiation procedure.

The capability information of the first advertising packet may further comprises information on dual mode for operating a communication link in the first radio communication mode and the communication link in the second radio communication mode simultaneously.

The sound wave communication module 112 supports the sound wave communication mode. The sound wave communication module 112 may include the speaker, microphone, and sound processing circuit used as a user interface of a typical electronic device and may operate under the audio processing and control of the control unit 130. For example, the procedure for the first electronic device 100 to output the first sound wave corresponding to the first advertising packet may include encoding the source data for the first advertising packet, generating an electric signal by modulating the encoded data, and outputting a sound wave through the speaker in accordance with the electric signal. Also, the procedure for the first electronic device 100 to receive the second sound wave corresponding to the second advertising packet may include converting the second sound wave received through the microphone to an electric signal, acquiring data by demodulating the electronic signal, and extracting the source data corresponding to the second advertising packet by decoding the demodulated data. The sound wave for use in communication may be an audible frequency band signal or inaudible frequency band signal. For example, the sound wave may be the signal at the boundary between the audible and inaudible frequency bands such as mosquito sound. The sound wave also may be the signal generated by synthesizing the excitement-inducing sound at the audible frequency band. For example, the control unit 130 may control the sound wave communication module 112 to output a music sound on the audible frequency band and a sound wave including the information or data on a part of the inaudible frequency band along with the music sound wave. In the case of using the macro wave for communication, the sound wave communication module 112 may include a transducer for outputting or receive the micro wave.

The second communication unit 120 supports the second radio communication mode. The second communication unit 120 includes a Bluetooth Classic module 121 supporting Bluetooth Classic communication, a Wi-Fi module 122 supporting Wi-Fi communication, a Wi-Fi Direct module for supporting Wi-Fi Direct communication, etc. The second communication unit 120 also may include a cellular communication module as well as the short range communication modules. The cellular communication module may be any of Global System for Mobile Communications (GSM), Wideband Code Division Multiple Access (WCDMA), HSDPA (High Speed Downlink Packet Access (HSDPA), Long Term Evolution (LTE), Worldwide Interoperability for Microwave Access (WiMAX) modules operating based on the communication technologies such as Time Division Multiplexing (TDM), Time Division Multiple Access (TDMA), Frequency Division Multiplexing (FDM), Frequency Division Multiple Access (FDMA), Code Division Multiplexing (CDM), Code Division Multiple Access (CDMA), Orthogonal Frequency Division Multiplexing (OFDM), Orthogonal Frequency Division Multiple Access (OFDMA), Multiple Input Multiple Output (MIMO), and smart antenna.

The second communication unit 120 establishes a communication link in the second radio communication mode between the first electronic device 100 and at least one target electronic device selected through the user interface. The at least one target electronic device is the electronic device to join in the communication service which is selected among the second electronic devices requesting for joining in the communication service. The second radio communication mode is used for establishing the communication link for the communication service. The second radio communication mode also may be the communication mode predetermined in accordance with the communication service. The second radio communication mode also may be determined in such a way of notifying to the peer electronic device in the first radio communication mode or negotiating between the electronic devices in consideration of their RF communication mode capability.

The second communication unit 120 of the first electronic device 100 is capable of establishing a communication link in the second radio communication mode by transmitting a communication channel request message to the at least one target electronic device. The control unit 130 also may control such that the second communication unit 120 is deactivated before transmitting the communication channel request message of the second radio communication mode. The control unit 130 may activate the second communication unit 120 to transmit the communication channel request message of the second radio communication mode to the target electronic device with which the negotiation procedure has completed in the first radio communication mode.

The first communication unit 110 and the second communication unit 120 may operate simultaneously. The control unit 130 may control the first electronic device to operate in the dual mode in which the first electronic device 100 maintains the first and second radio communication links with the at least one target electronic device. The control unit 130 also may control to maintain the communication service through the first radio communication mode link. That is, the control unit 130 may recover the second radio communication mode link using the first radio communication mode link to maintain the communication service. The control unit 130 also may switch from the second radio communication mode to the third radio communication mode using the first radio communication mode link so as to maintain the communication service in the third radio communication mode. Here, the third radio communication mode may be the RF communication mode negotiated between the electronic devices to replace the second communication mode. That is, the third radio communication mode may be one of the radio communication mode candidates with the exception of the communication mode selected as the second radio communication mode. The third radio communication mode may be designated automatically when the communication quality of the second radio communication mode does not fulfill a predetermined threshold.

The communication module may include at least one antenna, an RF circuit, and a modem and may be implemented in hardware or software. Some function module such as modem may operate in association with or with the communication processor of the control unit 130.

The control unit 130 may execute the application for providing the communication service from the memory 150 in response to the user input received through the user interface. If an event requesting to open the communication service is received through the user interface unit 140, the control unit 130 controls to generate the first advertising packet triggering the communication channel establishment between devices and transmit the first advertising packet by means of the first communication unit 110. If the second advertising packet is received by the first communication unit 110, the control unit 130 controls such that the user interface for selecting at least one target electronic device is displayed.

The control unit 130 also control the first electronic device to negotiate the second radio communication mode for establishing a connection with the at least one target electronic device through the first communication mode data channel. The second radio communication mode may be determined differently depending on the target electronic device. Although different second radio communication modes are determined for the at least one target electronic device, the control unit 130 may control such that the communication service is provided in the form of a same group at the application level. For example, the control unit 130 may restrict the flows and QoS or control to synchronize the progresses of the second radio communication modes based on the signal processing timing of the second radio communication mode operating at the lowest data rate.

The second radio communication mode may be preconfigured depending on the communication service. For example, the first electronic device 100 is capable of checking whether the at least one target electronic device supports the preconfigured radio communication mode through the negotiation procedure. The first electronic device 100 may transmit the communication connection request message to the target electronic device supporting the second radio communication mode in the second radio communication mode.

The control unit 130 controls to receive the communication service on the second radio communication mode link. The control unit 130 checks the communication link or communication service quality periodically and controls to maintain the communication service quality above a predetermined level. The control unit 130 controls the electronic device to operate in the dual mode in which the first and second radio communication mode links operate simultaneously.

The control unit 130 may include a Central Processing Unit (CPU), a Read Only Memory (ROM) storing the control program for controlling the first electronic device 100, and a Random Access Memory (RAM) used as the memory region for storing the signal or data input from outside of the first electronic device 100 and working space of the first electronic device 100. The CPU may be any of single-core, dual-core, quad-core, octa-core, and other multi-core CPUs. The CPU, ROM, RAM may be interconnected through internal buses or implemented as a single chip or a module.

The user interface unit 140 detects a user input requesting to open the communication service and generates an input single notifying of the communication service open request. The user interface unit 140 provides the user interface in order for the user to select and invite at least one other device, from which the second advertising packet was received, to join the communication service. The user interface unit 140 is responsible for input and/or output function for providing the second radio communication mode-based communication service.

The user interface unit 140 may include a display module 141, a touch panel 142, and a button 143. It is obvious to those skilled in the art that the speaker, microphone, and sound processing circuit included in the sound wave communication module 112 may operate as a user interface.

The display module 141 may be implemented with any of Liquid Crystal Display (LCD), a Thin Film Transistor LCD (TFT-LCD), Organic Light-Emitting Diode (OLED), flexible display, 3-dimensional (3D) display, and electrophoretic display.

The touch panel 142 may be implemented in one of resistive, capacitive, electromagnetic type, Electronic Magnetic Resonance (EMR) type, infrared type, and acoustic wave type.

The display module 141 and the touch panel 142 may be integrated into a touchscreen. In this case, the user interface unit 140 may further include a touchscreen controller. The touchscreen is capable of detecting a touch gesture made with a means such as user's fingers and/or touch input or a touch input tool. The touchscreen may include a pen-recognition panel capable of detecting a gesture made with a pen such as stylus pen and electronic pen. The touchscreen also may implemented in such a way of layering the panel of detecting change in induced electromotive force by means of the finger or other input unit, a display panel, and a panel capable of detecting the contact based on the change in resistance or capacitance tightly or with a gap. The touchscreen controller converts the analog signal received through the touchscreen to a digital signal (e.g. X and Y coordinates) and transfers the digital signal to the control unit 130. The control unit 130 is capable of controlling the touch screen based on the digital signal received from the touchscreen controller. The touchscreen controller may be included in the control unit 110.

The button 143 may generate an input signal in response to the user's selection for controlling the first electronic device 100. The button 143 may be any of a physical button (or key) formed on the body of the first electronic device 100 or a virtual button or virtual keypad presented on the touchscreen. The physical keypad may be omitted depending on the structure of the first electronic device 100.

The user interface unit 140 may include a vibration motor to output haptic effect to the user and a connector or connection jack for connection to an external input/output device.

The first electronic device 100 includes a memory 150. The memory may include the ROM and RAM inside the control unit 130 and/or memory card (e.g. SD card, memory stick, etc.) attachable to the electronic device 100. The memory 150 may be implemented with any of non-volatile memory, volatile memory, hard disk drive (HDD), and Solid State Drive (SSD).

The memory 150 may store the images associated with the applications of various functions such as navigation and game functions as well as the communication service application, databases and data associated with the user information, documents, and touch input processing method, background images (menu screen, standby screen, etc.), operating programs, and images taken by the camera module 171.

The memory 150 may include non-transitory machine-readable (e.g. computer-readable) medium. The memory 150 is capable of accessing information from the non-transitory machine-readable medium and storing the accessed information under the control of the control unit 130. The non-transitory machine-readable medium may be a medium providing data in order for the machine to perform a certain function. For example, the non-transitory machine readable medium may be storage medium. The non-transitory machine-readable storage medium may be any of floppy disk, flexible disk, hard disc, magnetic tape, compact disc read-only memory (CD-ROM), optical disc, punch card, pater tape, Random Access Memory (RAM), Programmable RAM (PROM), Erasable PROM (EPROM), and FLASH-EPROM.

The first electronic device 100 includes a power supply 160. The power supply 160 may be arranged in the housing of the first electronic device 100 and include at least one of a battery (not shown), a power supply circuit, and a battery charging circuit. The power supply 160 may supply power to the first electronic device 100. The power supply 160 may supply the power input from an external power source (not shown) through a cable connected via a connector to the first electronic device 100 or the battery. The power supply 160 may supply the power input from an external power source to the first electronic device 100 or charge the battery of the first electronic device wirelessly using the wireless charging technology.

The first electronic device 100 further includes a sensor unit 170. The sensor unit 170 may include at least one sensor for sensing the state of the first electronic device 100 and/or the surroundings of the electronic device 100. For example, the sensor unit 170 may include a camera module 171 for taking pictures of scenes and user, a proximity sensor 172 for detecting approach of an object to the first electronic device 100, a luminous sensor (not shown) for sensing intensity of external light, a motion sensor (not shown) for detecting the motion of the electronic device 100 (e.g. rotation of the electronic device 100 and acceleration or vibration applied to the first electronic device 100), a geo-magnetic sensor for sending the point of the compass using the geo-magnetic field, a gravity sensor for sensing the gravity direction, and an altimeter for measuring the atmospheric procedure to sense the altitude. The sensor unit 170 may further include a GPS module for receiving electric wave from a plurality of GPS satellites (not shown) on the orbit and calculates the position of the first electronic device 100 based on the Time of Arrival to the first electronic device 100.

The camera module 171 includes a lens system and image sensor for taking still and motion pictures under the control of the control unit 130. The camera module 171 may further include a barrel for zooming in/out to shoot a picture a subject, a motor for driving movement of the barrel, and a flash as an auxiliary light source necessary for shooting a picture of a subject. The first electronic device 100 may two or more camera modules (front and rear-facing). The camera module 171 converts the optical signal input (or taken) through the lens system to the electric image signal and transfers the electric signal to the control unit 130 or the display module 141, and the user may shoot a still or motion picture using the camera module.

At least one sensor detects the state of the first electronic device 100 and generates a corresponding signal to the control unit 130. The sensor unit 170 may be implemented with or without any sensor depending on the performance specification of the first electronic device 100.

Figure 5:
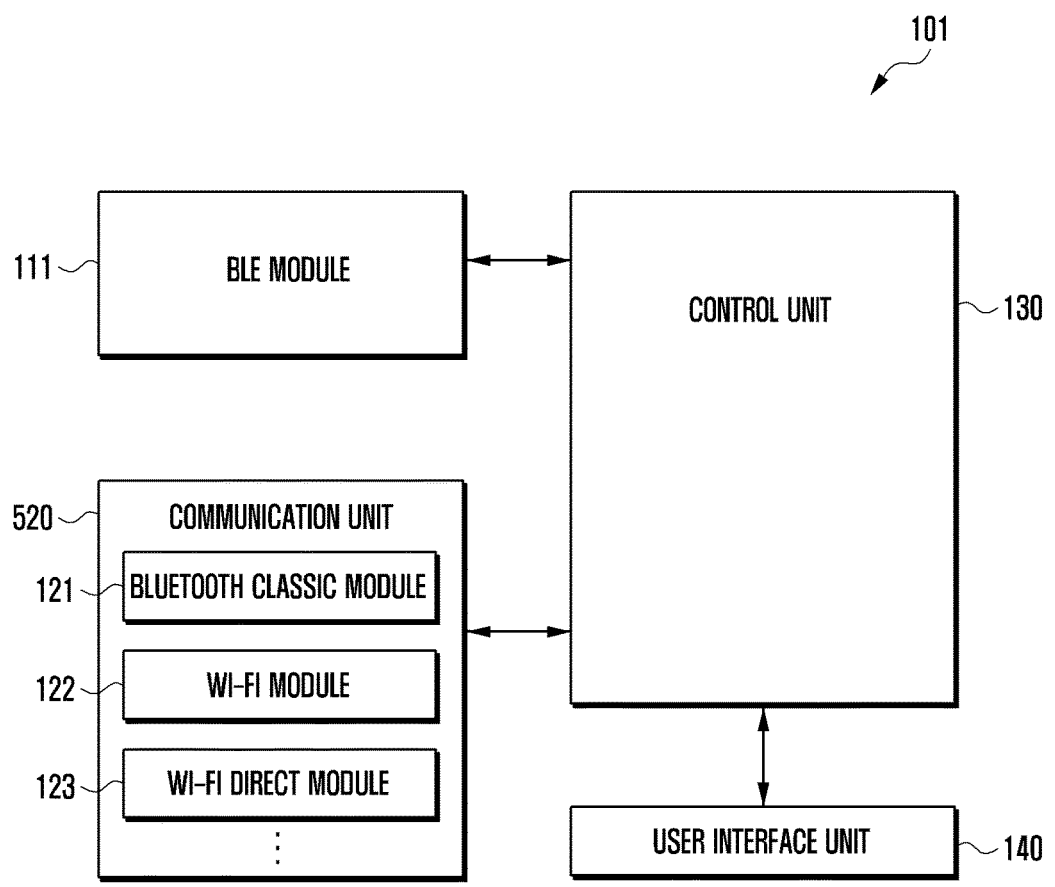
FIG. 5 is a block diagram illustrating a further example configuration of an electronic device in accordance with aspects of the present disclosure.

FIG. 5 is a block diagram illustrating another example configuration of the first electronic device in accordance with aspects of the present disclosure. As with the device in FIG. 2, it is understood that the device in FIG. 5 is merely illustrative and that various alternate configurations of the device may be implemented.

As shown in FIG. 5, the first electronic device 101 includes a BLE module 111, an RF communication unit 520, a user interface unit 140, and a control unit 130. The first electronic device 101 of FIG. 5 includes the BLE module 111 as the function block supporting the first radio communication mode instead of the first communication unit 110 including various radio communication modules and the RF communication unit 520 supporting the second radio communication mode instead of the second communication unit 120 in the first electronic device 100 of FIG. 2. Accordingly, the detailed descriptions on the same function blocks and module description with reference to FIG. 2 are omitted herein.

The BLE module 111 broadcasts the first advertising packet including the identifier of the first electronic device 101, the information on the communication service opening, and RF communication mode capability in the BLE communication mode. The BLE module 111 may receive at least one responding advertising packet requesting to join in the communication service based on the BLE communication mode of at least one other electronic device within proximity of the first electronic device 101.

The user interface unit 140 may provide a user interface for the user to select at least one target electronic device to be joined in the communication service.

The RF communication unit 520 establishes a communication link with the at least one target electronic device in the BLE communication mode and/or other RF communication mode based on the capability information.

The control unit 130 controls to perform communication through the communication link.

Figure 6:
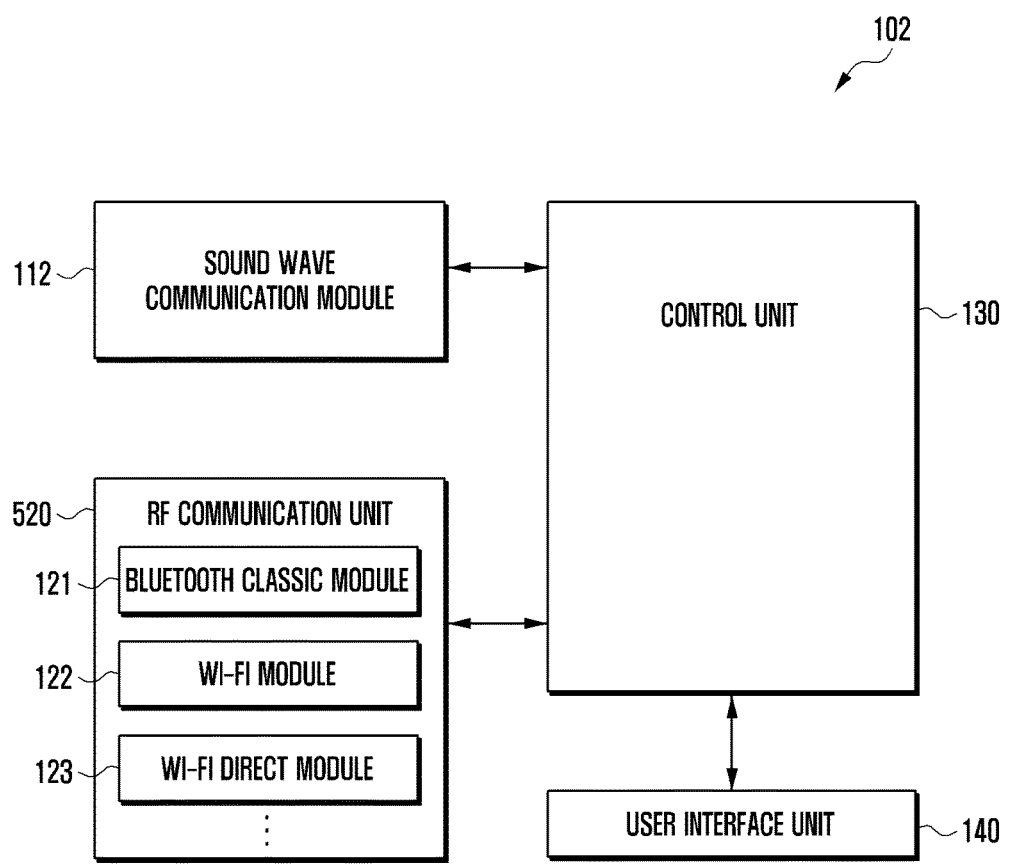
FIG. 6 is a block diagram illustrating yet another example configuration of an electronic device in accordance with aspects of the present disclosure.

FIG. 6 is a block diagram illustrating yet another example configuration of the first electronic device in accordance with aspects of the present disclosure. As with the previous illustrations of the first electronic device, it is understood that FIG. 6 is merely illustrative and that alternate configurations may be implemented.

In FIG. 6, the first electronic device 102 includes a sound wave communication module 112, an RF communication unit 520, a user interface unit 140, and a control unit 130. The first electronic device 102 of FIG. 6 includes the sound wave communication module 112 as the function block supporting the first radio communication mode instead of the first communication unit 110 of the first electronic device 100 and the RF communication unit 520 corresponding to the second communication unit 120 supporting the second radio communication mode in FIG. 2. Accordingly, the detailed descriptions on the same function blocks and module description with reference to FIG. 2 are omitted herein.

The sound wave communication module 112 outputs a first sound wave including an identifier of the first electronic device 100, communication service opening information, and an RF communication mode capability information. The sound wave communication module 112 receives at least one other sound wave requesting to join the communication service from at least one other electronic device within proximity of the first electronic device 102.

The user interface unit 140 provides a user interface for the use to select at least one target electronic device to be joined in the communication service.

The RF communication unit 520 establishes a communication link with the at least one target electronic device in the BLE communication mode and/or other RF communication mode based on the capability information.

The control unit 130 controls to perform communication through the communication link.

Figure 7:
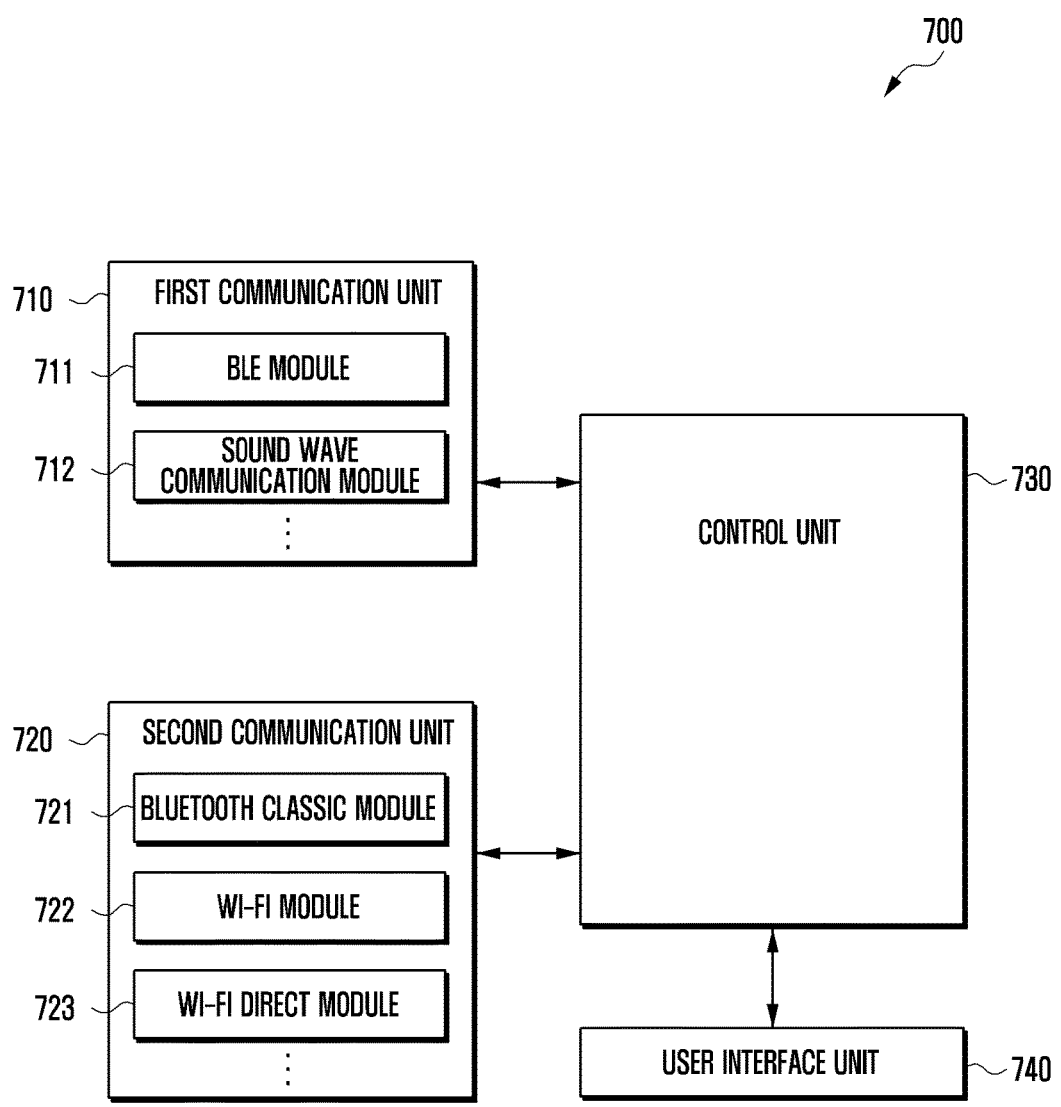
FIG. 7 is a block diagram illustrating an example configuration of at least one other device in accordance with aspects of the present disclosure.

FIG. 7 is a block diagram illustrating a configuration of another or a second electronic device in accordance with aspects of the present disclosure, which is also understood to be illustrative. Therefore, alternate configurations of the second electronic device shown in FIG. 7 could be carried out. Detailed descriptions on the units or module constituting the second electronic device that are identical with those of the first electronic device 100 of FIG. 2 may be omitted herein. The functions or and operations of the second electronic device 200 as a peer to the first electronic device 100 will be understood by referencing the packet or signal transmission/reception function and procedure described in association with the first electronic device of FIG. 2 and through the entire specification.

The second electronic device 200 includes a first communication unit 710, a second communication unit 720, a control unit 730, and a user interface unit 740.

The first communication unit 710 includes a BLE module 711 and a sound wave communication module 712. The first communication unit 710 receives the first advertising packet including the identifier of the first electronic device 100, communication service opening information, and capability information this is broadcasted by the first electronic device in the second radio communication mode. Here, the first advertising packet may include transmission power information. The first communication unit 710 may measure RSSI of the first advertising packet. The control unit 730 may calculate the pathloss from the first electronic device 100 to the second electronic device 200 using the measured RSSI and the transmission power information received from the first electronic device 100. If the pathloss is greater than a predetermined value, the control unit 730 determines that it cannot join the communication service and thus does not request to join in the service. The first advertising packet may include a company identifier and/or protocol version field. The control unit 730 may check the company identifier or the protocol version included in the first advertising packet to determine whether the corresponding protocol is supportable.

In order to reduce the unnecessary power consumption caused by frequency activation of the control unit 730 to determine whether to join the communication service whenever the broadcast signal such as the first advertising packet is received, the second electronic device 200 may further include a separate signal detection module. That is, when the first communication unit 710 is activated to scan around for signals, the signal detection module calculates the RSSI or pathloss of the received signal instead of the control unit 730 in the inactive state to filter the appropriate signal. The signal detection module may check the company identifier or the protocol identifier such that the control unit 730 stays in the inactive state without decoding or analyzing the signal based on a protocol that is not supported. If it is determined that the pathloss and the protocol are available for the communication service based on the first advertising packet, the control unit 1539 generates an activation signal. The signal detection module may be included in the first communication unit 710 or the control unit 730 in accordance with the design of the signal detection module.

The control unit 730 may control the user interface unit 740 to display a user interface in order for the user to designate whether to join the communication service in response to the communication service information included in the first advertising packet.

The user interface unit 740 provides a user interface prompting the user to designate whether to request to join the communication service. The user interface unit 740 also supports the input and/or output function for providing the communication service based on the second radio communication mode.

If second electronic device 200 joins the communication service in response to input made through the user interface, first communication unit 710 sends the first electronic device 100 a second advertising packet request to join the communication service in the first radio communication mode. The second advertising packet includes the identifier (or device address) of the first electronic device 100 and the identifier (or device address) of the second electronic device 200. In order to indicate the request for joining a specific communication service, the second advertising packet may further include a service identifier field and a service state field containing the value indicating the request for joining the service identified by the service identifier. In the case that multiple communication services are provided between the two electronic devices, the communication services are differentiated based on the service identifier field and the service state field. The second advertising packet may have no data structure field for use in requesting to join the service but ADV_DIRECT_IND PDU may be used depending on the PDU type included in the second advertising packet. It may be negotiated among the electronic devices that if the ADV_DIRECT_IND PDU is used as the second advertising packet the second electronic device 200 transmitting the second advertising packet is notifying the first electronic device of requesting for joining the communication service.

The control unit 730 may control the negotiation between first and second electronic devices 100 and 200 using the secured first radio communication data channel established by means of the first communication unit 710. In a further example, the capacity negotiation procedure may be omitted. For example, the first advertising packet may include the radio communication mode and the identifier of the corresponding radio communication mode (e.g. MAC address or device address) as the capability information on the first electronic device 100. The second advertising packet also may include the radio communication mode and the identifier of the corresponding radio communication mode as the capability information on the second electronic device 200. For example, the second advertising packet may include the information on the second radio communication mode designated by the second electronic device in consideration of the capability information on the first electronic device 100. In this case, the first radio communication mode data channel-based capability negotiation procedure may be omitted, and the first electronic device 100 may transmit a message requesting for establishing a communication channel to the second electronic device 200 designated as the target electronic device using the second radio communication mode.

The second communication unit 720 includes a Bluetooth Classic module 721, a Wi-Fi module 722, and a Wi-Fi Direct module 723. The second communication unit 720 establishes a second radio communication mode link between the first and second electronic devices 100 and 200 based on the capability information. For example, if a negotiation request message related to the second radio communication mode is received, the second electronic device 200 designated as the target electronic device may perform the negotiation procedure. Through the negotiation procedure based on the capability informations of the first and second electronic devices 100 and 200, the second radio communication mode is determined, and the identifier (e.g. MAC address or device address) of the second radio communication mode of one of the two electronic devices is acquired by the at least one other electronic device. If the identifier of the second radio communication mode of the peer electronic device is acquired, a communication connection request message may be transmitted to the peer electronic device in the second radio communication mode. For example, the second electronic device 200 may transmit the identifier of the second radio communication mode to the first electronic device 100, and the first electronic device 100 may receive the communication connection request message from the first electronic device 100 in the second radio communication mode.

The control unit 730 controls the communication service between the first and second electronic devices 100 and 200 through the communication link established in the second radio communication mode. In the case that the first and second communication modes links are maintained in the dual mode, the control unit 730 may control to recover the second radio communication mode or switch from the second radio communication mode to the third radio communication mode through control channel exchange with the first electronic device 100 in the first radio communication mode.

Figure 8:
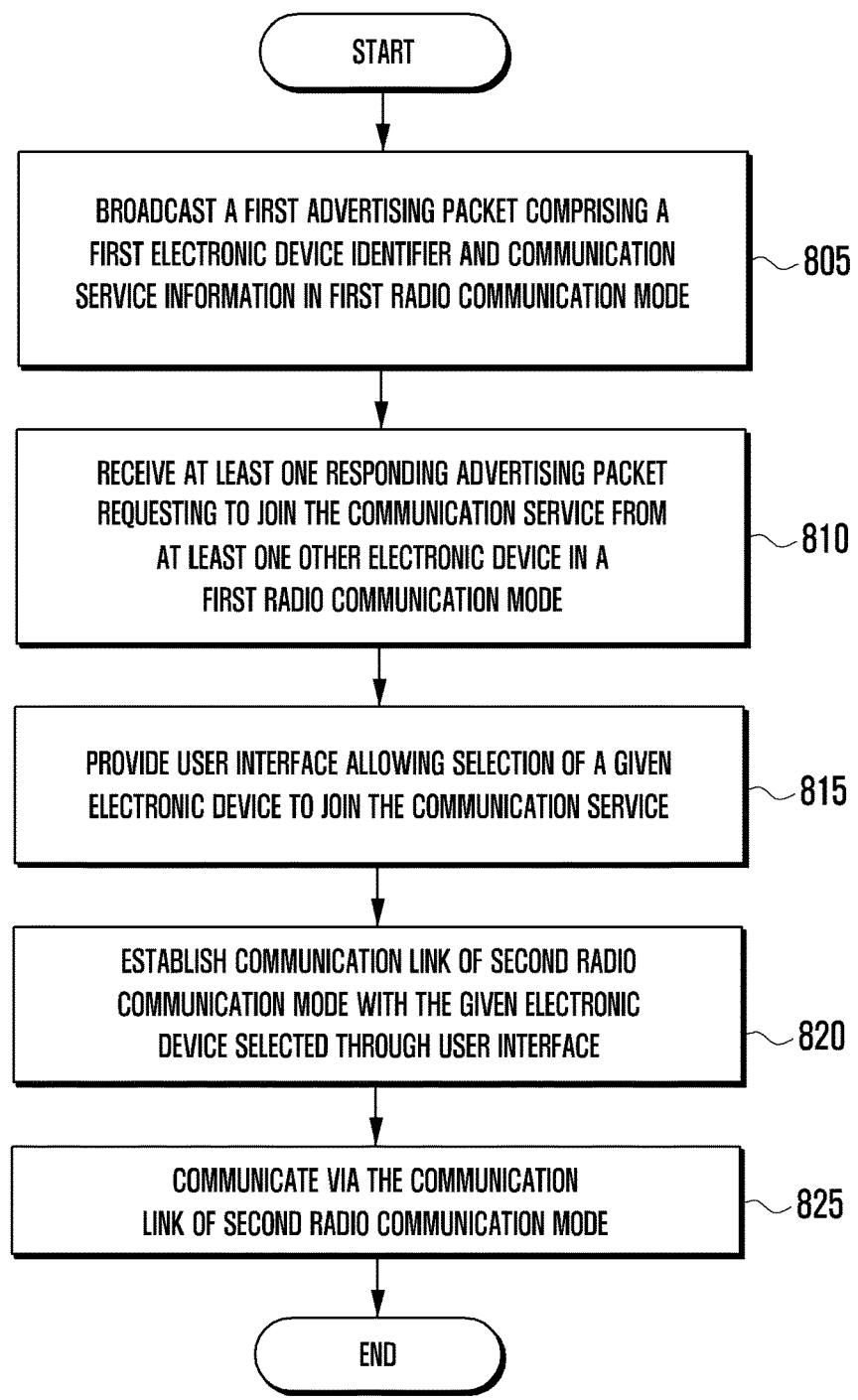
FIG. 8 is a flowchart illustrating an example operation procedure of an electronic device in accordance with aspects of the present disclosure.
Figure 9:
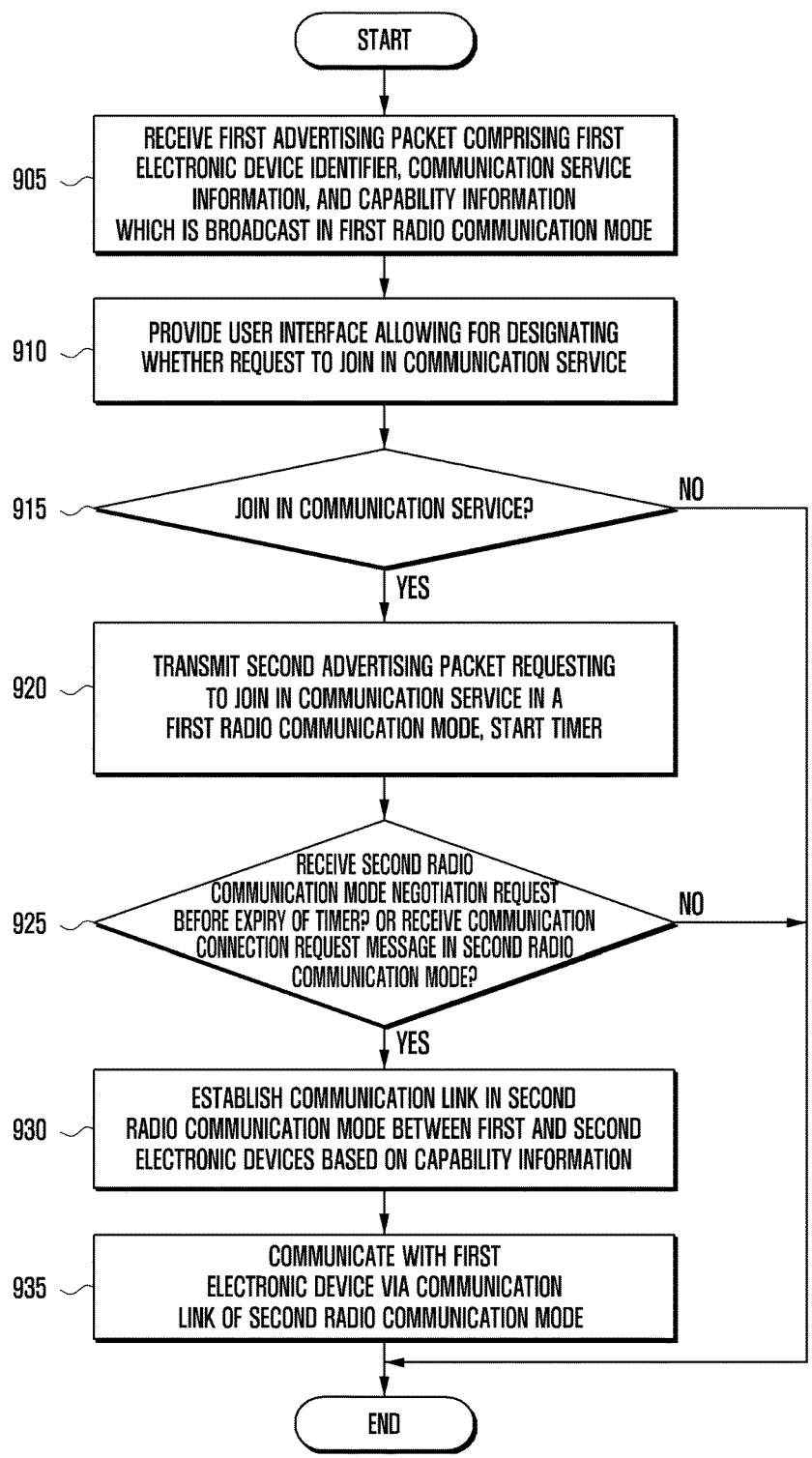
FIG. 9 is a flowchart illustrating an example operation procedure of at least one other device in accordance with aspects of the present disclosure.
Figure 10:
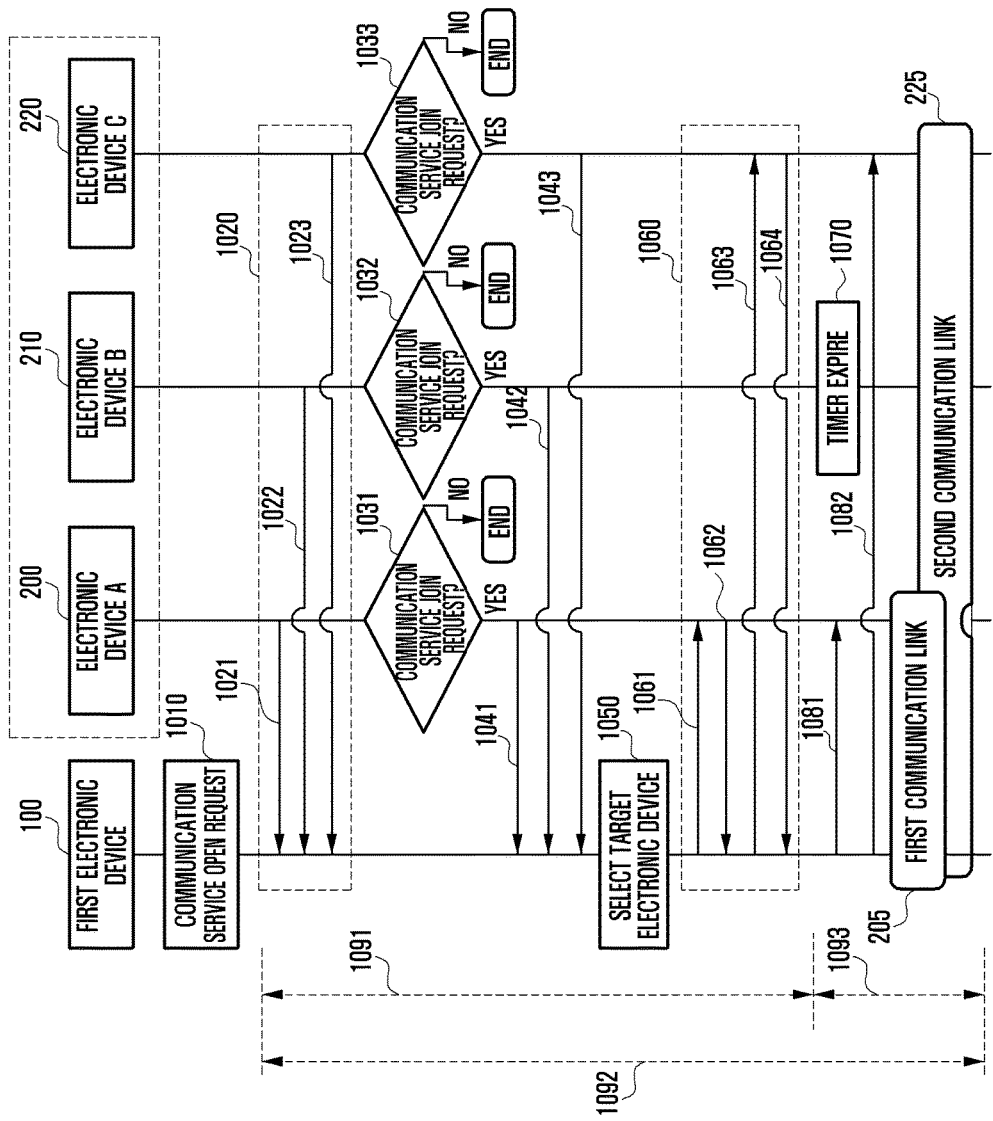
FIG. 10 is a flow diagram illustrating a working example of signal flows between electronic devices in accordance with aspects of the present disclosure.
Figure 11:
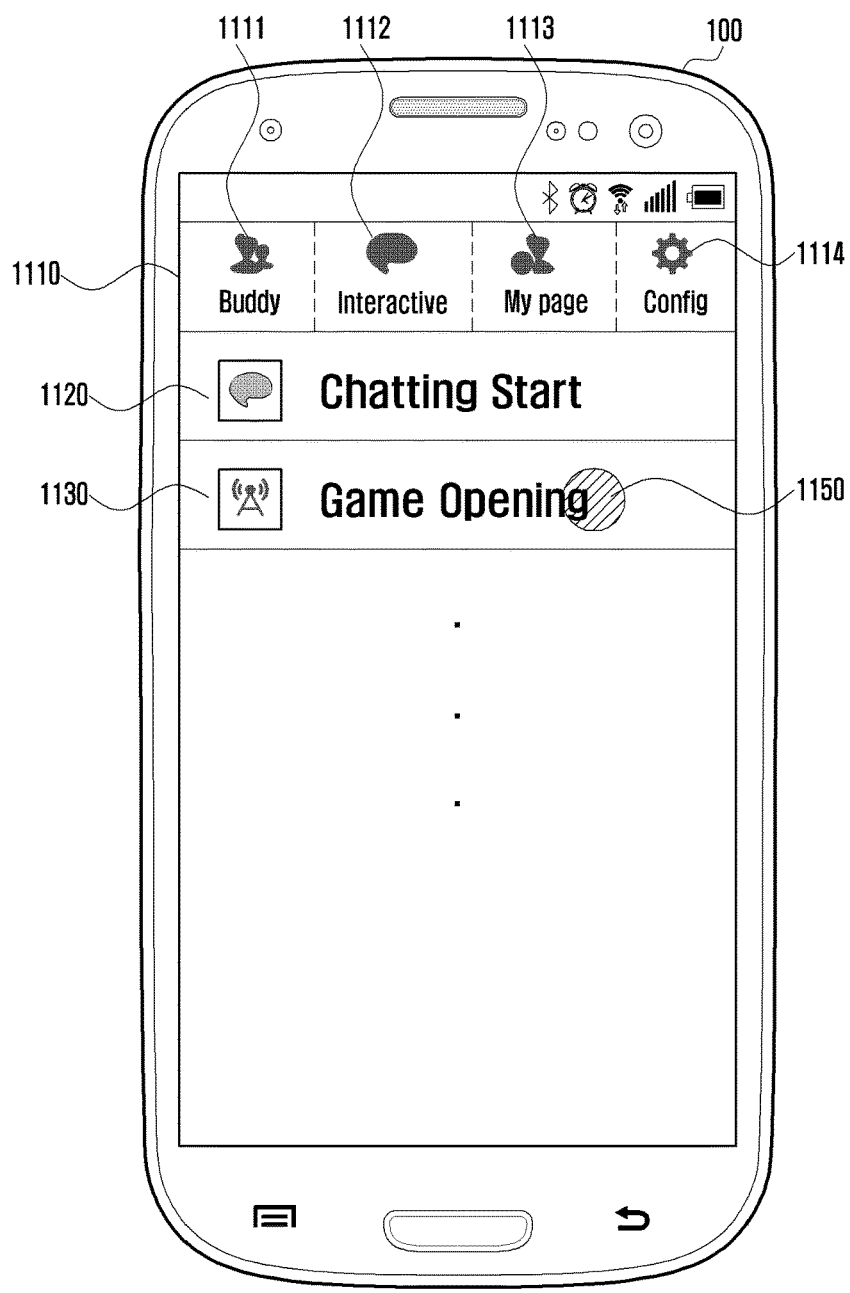
FIG. 11 is a diagram illustrating an example user interface of an electronic device in accordance with aspects of the present disclosure.

FIG. 8 is a flowchart illustrating an example procedure of the first electronic device in accordance with aspects of the present disclosure. FIG. 9 is a flowchart illustrating an example operation procedure of the second electronic device in accordance with aspects of the present disclosure. FIG. 10 is a diagram illustrating example signals flows among the electronic devices in accordance with aspects of the present disclosure. FIG. 11 is an illustrative user interface in accordance with aspects of the present disclosure. As noted above in FIG. 1, there is at least one other electronic device (electronic device 200, electronic device 210, and electronic device 220 within proximity of the first electronic device 100 of FIG. 10.

In FIG. 10, the first electronic device 100 receives a communication request input by the user at operation 1010. The first electronic device 100 provides a user interface for opening the D2D-based communication service as shown in FIG. 11. The user interface is provided with a menu 1110 including a plurality of menu taps of "buddy" 1111, "interactive" 1112, "my page" 1113, and "settings" 1114. If the "interactive" 1112 is selected, a list of items associated with the D2D-based communication services such as "channel start" and "game opening." If the user selects the "game opening" 1130, the first electronic device 100 detects this as a communication service opening request event.

The first electronic device 100 broadcasts the first advertising packet including its identifier and communication service information in the first radio communication mode at operation 1020 (or operation 805 of FIG. 8). Here, the first advertising packet may include a communication service field as the communication service information. The first advertising packet may further include radio capability information associated with the first electronic device 100. The capability information in the first advertising packet may include a field indicating the second radio communication mode and a MAC address field corresponding to the second radio communication mode. Here, capability information may include the information on the dual mode capability of operating the first and second radio communication mode links simultaneously. The first advertising packet may further include a company identifier indicating at least one of the manufacturer and the communication service provider. The first advertising packet may further comprise transmission power information. The transmission power information can be used for calculating the pathloss along with the RSSI of the first advertising packet that is measured by at least one other electronic device (electronic device 200, electronic device 210, and electronic device 220).

The first electronic device 100 receives at least one responding advertising packet broadcast by at least one other electronic device at operations 1021, 1022, and 1023 of FIG. 10. That is, the second electronic device 200 receives the first advertising packet including the identifier of the first electronic device 100, communication service information, and capability information that are broadcast in the first radio communication mode at operation 905 of FIG. 9. The operations 1021, 1022, and 1023 have no particular order.

If it is available to join in the communication service in view of the pathloss, the at least one other electronic device displays the user interface for designating whether to join in the service. That is, the second electronic device 200 provides the user interface for designating whether to join in the communication service opened by the first electronic device 100 at operation 910 of FIG. 9. Referring to the example display of FIG. 12, the second electronic device 200 may provide the user interface for designating whether to requesting to join the communication service in the form of a popup window. As shown in the example user interface of FIG. 12, the background screen 1210 or application execution screen of the second electronic device 200 may display a window 1220 comprising: information of the electronic device that opened the communication service; a prompt asking whether to join the communication service; a button 1221 generating a signal input to join the communication service; a button 1222 generating a signal input for not joining the communication service.

Figure 12:
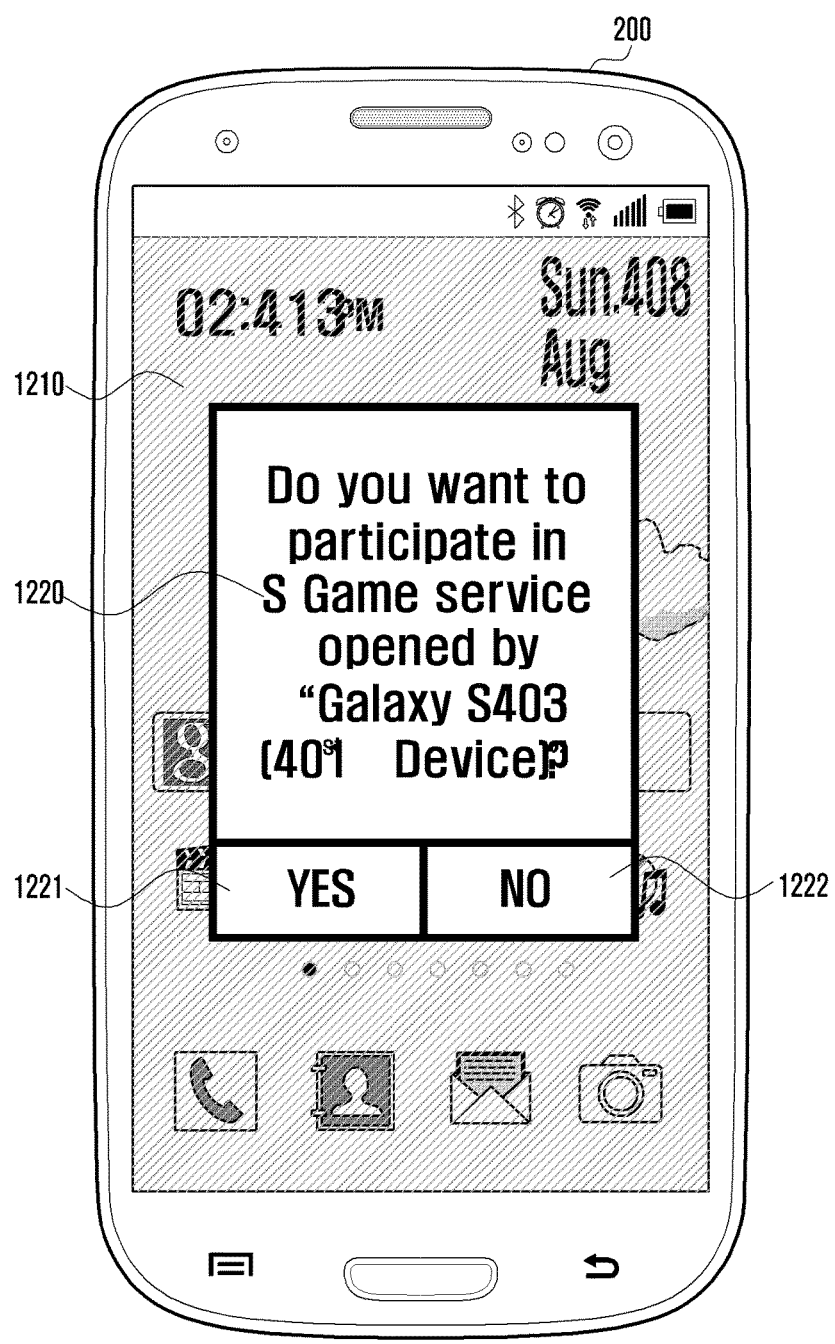
FIG. 12 is a diagram illustrating another example user interface of at least one other device for requesting to join a communication service in accordance with aspects of the present disclosure.

The at least one other electronic device may determine whether to join in the communication service at operations 1031, 1032, and 1033. Electronic device 200 determines whether to join in the communication service based on the user input made through the user interface at operation 915 of FIG. 9. For example, if the button 1221 of FIG. 12 is selected, the second electronic device 200 requests to join the communication service. Otherwise, if the button 1122 of FIG. 12 is selected, the second electronic device 200 terminates the communication service execution procedure. If no user input to join the communication is made through the user interface of the second electronic device during a predetermined time, the first electronic device determines may assume there is no interest in joining the communication service and terminates the communication service procedure.

Assuming that the electronic device 200, electronic device 210, and electronic device 220 have requested to join in the communication service in response to the user input, at least one other electronic device transmits the second advertisement packet requesting to join the communication service. That is, the second electronic device 200 transmits the second advertising packet requesting to join the communication service in the first radio communication mode at operation 920 of FIG. 9. Here, the second advertising packet may be transmitted on the first radio communication mode advertising channel. The second advertising packet may include the capability information on the second electronic device 200 which includes the information on the second radio communication mode. The second advertising packet may include the information on the second radio communication mode selected by the second electronic device in consideration of the capability information.

The second electronic device 200 may start a timer for determining whether to execute the operation for the communication service at operation 920 of FIG. 9. The timer may be used for determining whether the first radio communication mode negotiation request message or the second radio communication mode connection request message is received from the first electronic device 100 before the predetermined time expires.

The first electronic device 100 receives at least one responding advertising packet request for joining the communication service in the first radio communication mode from at least one electronic device at operations 1041, 1042, and 1043 and at operation 810 of FIG. 8.

Figure 13:
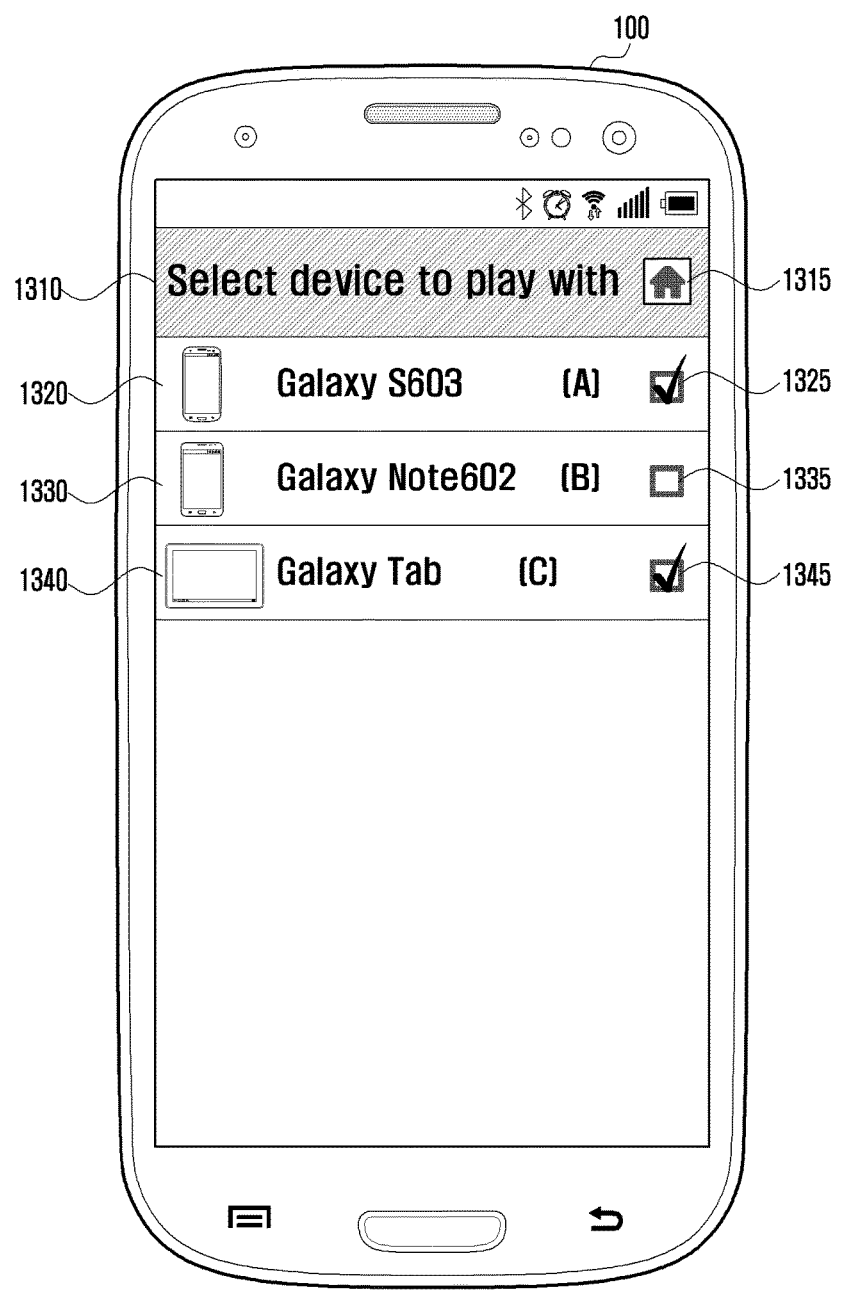
FIG. 13 is a diagram illustrating an example user interface of an electronic device for selecting a target electronic device in accordance with aspects of the present disclosure.

The first electronic device 100 provides the user interface for selecting at least one target electronic device to join in the communication service at operation 815 of FIG. 8. Referring to FIG. 13, the first electronic device 100 may display the user interface including items 1320, 1330, and 1340 associated with the electronic devices located within proximity of the first electronic device and interactive objects (e.g. check boxes) 1325, 1335, and 1345 capable of receiving the user input for selecting the second electronic devices as target electronic devices. The user interface 1310 may include the button 1315 capable of returning to the interface of the previous screen (or initial screen). The items 1320, 1330, and 1340 may include device name, user name, and device icon as the identifier of the at least one other electronic device. For example, item 1320 corresponds to electronic device 200, item 1330 to electronic device 210, and item 1340 to electronic device 220. At least one other device may be selected to join the communication service in response to user input to interaction objects 1325 and 1345. Although not depicted in FIG. 13, the screen of the first electronic device 100 may include a connection button expressed as 'Connect'. If the user input is made to the connection button, the operation for executing the communication service with the at least one target electronic device (e.g., electronic device 200 and electronic device 220) may be performed continuously.

The first electronic device 100 establishes a second radio communication mode link with a given device selected through the user interface at operation 820 of FIG. 8.

Figure 14:
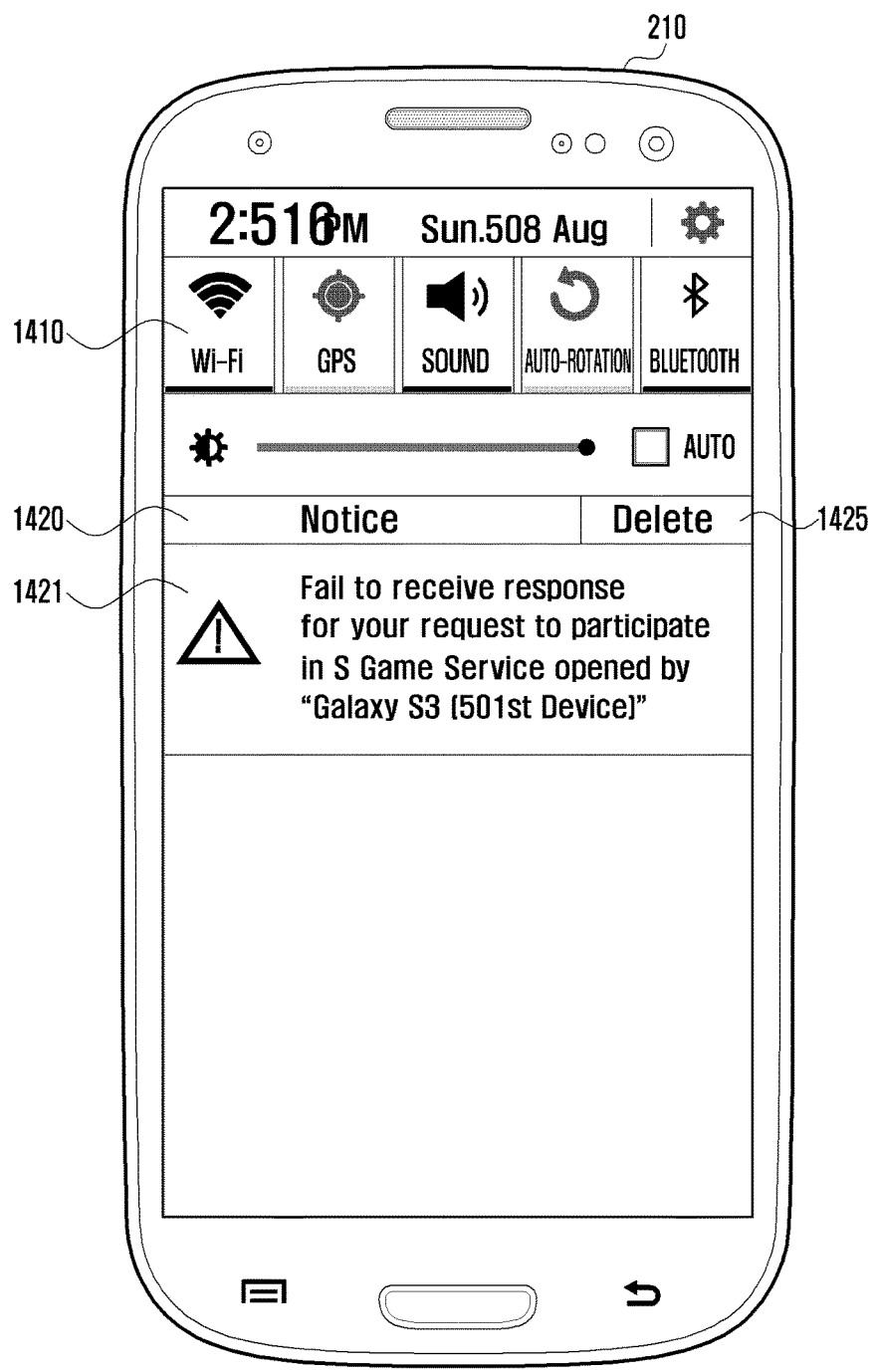
FIG. 14 is a diagram illustrating another example user interface of at least one other device in accordance with aspects of the present disclosure.

The second electronic device 200 may determine whether the second radio communication mode negotiation request message or second radio communication mode communication connection request message is received from the first electronic device 100 before the expiry of the timer at operation 925 of FIG. 9. For example, if the electronic device 210 does not receive the second radio communication mode negotiation request message or second radio communication mode communication connection request message before the expiry of the timer at operation 1070 of FIG. 10, the electronic device 210 terminates the communication service execution operation. Referring now to FIG. 14, the screen of the electronic device 210 displays prompt 1421 that notifies that the response in reply to the communication service invitation was not received. Prompt 1421 may be presented in the form of a quick panel as shown in FIG. 14 or a popup window. The quick panel may include a configuration menu 1410 for configuring radio communication mode and sensor activation/deactivation, sound, vibration, screen brightness, and a notice list 1420. The prompt 1421 may be displayed as an item of the notice list. The item of the notice list may disappear from the quick panel in response to the selection of the delete button 1425.

If the negotiation request message or the communication connection request message is received before the expiry of the timer, the first and second electronic devices 100 and 200 may exchange signals in accordance with the communication channel establishment procedure. Accordingly, the second electronic device 200 establishes the second radio communication mode communication link between the first and second electronic devices 100 and 200 based on the capability information, as shown in operation 930 of FIG. 9, and communicates via the communication link, as shown in operation 935 of FIG. 9.

Figure 15:
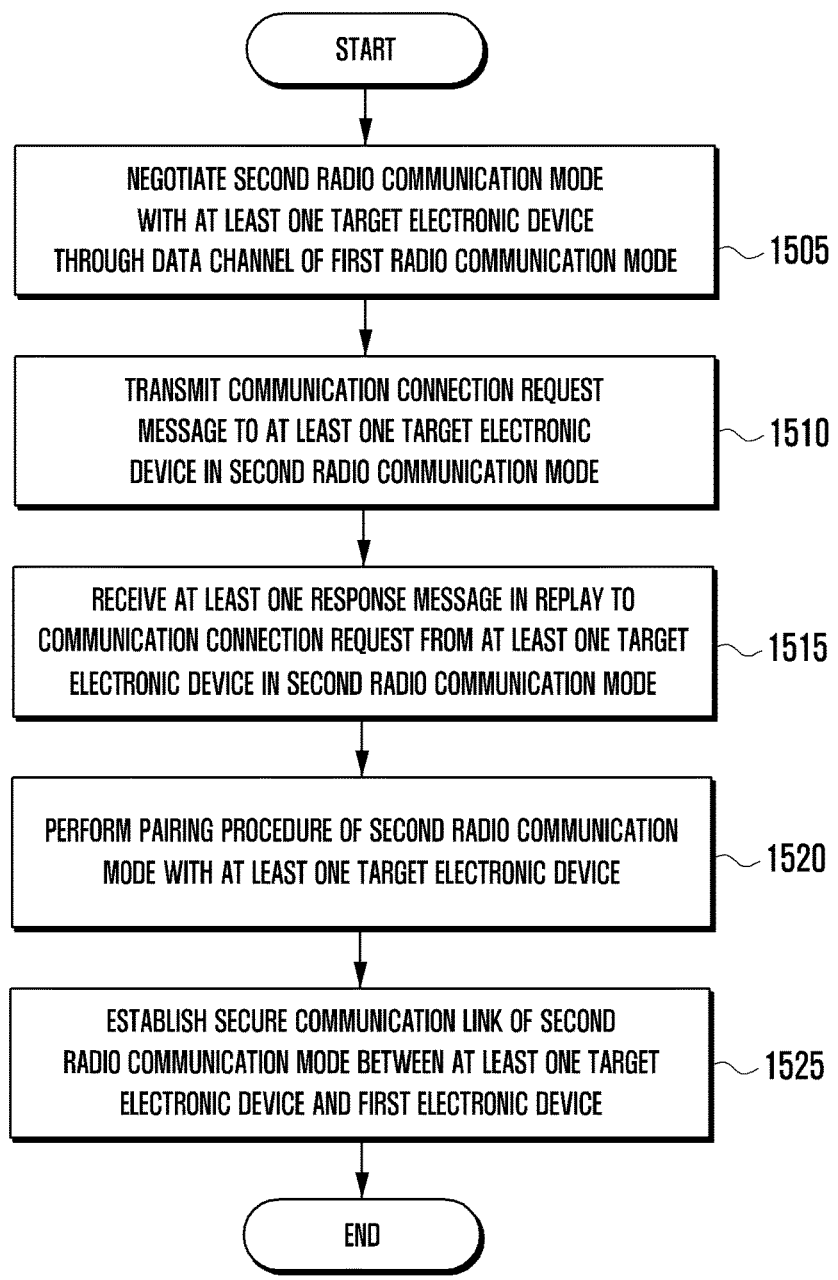
FIG. 15 is a flowchart illustrating an example procedure of establishing a communication link in a radio communication mode in accordance with aspects of the present disclosure.

A description is made of the method for establishing a communication link in the second radio communication mode with reference to FIG. 15.

The first electronic device 100 may negotiate with at least one target electronic device in the second radio communication mode when attempting to connect to the at least one target electronic device. Such negotiation may be done through the data channel of the first radio communication mode. For example, operation 1060 of FIG. 10 shows the negotiation procedure between the first electronic device 100 and the at least one target electronic device. The first electronic device 100 may transmit the negotiation request message including the information associated with the second radio communication mode to electronic device 200 and the electronic device 220 through the data channel of the first radio communication mode at operations 1061 and 1063. The electronic device 200 and electronic device 220 may transmit a negotiation response message including the second communication mode identity information or the second radio communication mode-based identifier (e.g. MAC address) to the first electronic device 100 at operation 1062 and 1064. As well as performing the one-time handshaking between two electronic devices as denoted by operation 1060, multi-time handshaking negotiation may be performed in accordance with a predetermined protocol. It should be noted that the electronic devices transmitting and receiving information for use in establishing a connection in the second radio communication mode may by switched in their roles. For example, the first electronic device 100 may transmit the second radio communication mode-based identifier information to the target electronic device. In this case, the corresponding target electronic device may transmit the connection establishment request message to the first electronic device 100 in the second radio communication mode. The descriptions on the operation 1505 for negotiating the second radio communication mode or operation 1060 of FIG. 10 may be omitted.

The first electronic device 100 may transmit the communication connection request message to at least one other electronic device in the second radio communication mode at operation 1510. For example, the first electronic device 100 may transmit the communication connection request message in the second radio communication mode negotiated with the electronic device 200 and electronic device 220 at operations 1081 and 1082.

The first electronic device 100 may receive at least one response message from the at least one other electronic device in response to the communication connection request in the second radio communication mode.

The first electronic device 100 may perform a pairing procedure in the second radio communication mode with at least one other device (e.g., electronic device 200 and electronic device 220) at operation 1520. Here, the pairing procedure may be an authentication procedure for security connection with the corresponding electronic device before establishing the communication link. The pairing procedure may be performed through one-time message or signal exchange. In another example, the pairing procedure of operation 1520 may be omitted. For example, receiving the user input for accepting or requesting for communication connection establishment through the user interfaces of the first electronic device 100 and the at least one target electronic device may be regarded as authentication without an extra signal exchange procedure for authentication. Also, the authentication on the second radio communication mode connection request message or connection response message may be conducted using the code generated by or exchanged among the electronic devices at operations 1041 to 1043 or operation 1060 of FIG. 10.

The first electronic device 100 may establish a secure communication link in the second radio communication mode with at least one target electronic device at operation 1525. For example, the first electronic device 100 may establish the first communication link 205 with the electronic device 200 and the second communication link 225 with the electronic device 220 in FIG. 10.

The first electronic device 100 communicates with a given target electronic device via communication links 205 and 225 in the second radio communication mode at operation 825 of FIG. 8. The second electronic device 200 communicates with the first electronic device 100 via communication link 205 in the second radio communication mode.

Referring to FIG. 10, the first electronic device 100 may operate in the first radio communication mode from the time of advertising the first packet until receipt of the second advertising packet, or from the time the first advertising packet is transmitted until the second radio communication mode negotiation completes, as denoted by reference number 1091.

The first electronic device 100 may operate in the second radio communication mode from the time the connection request message is transmitted until the communication service completes over the communication link, as denoted by reference number 1093.

In one example, the second radio communication mode may be deactivated during the time represented by reference 1091, and the first radio communication mode may be deactivated during the time represented by reference 1093.

In a further example, the first and second radio communication modes may be activated simultaneously during the time represented by reference 1093 in a dual mode. For example, the first radio communication mode may be in the active state during the time represented by 1092 from the time the first advertising packet is transmitted until the communication service completes. Operation 820 of FIG. 8 may include maintaining a communication link in the first radio communication mode with the at least one other electronic device in conjunction with the communication link in the second radio communication mode. Operation 820 also may include maintaining the communication service using the communication link in the first radio communication mode. Maintaining the communication service may comprise recovering the communication link in the second radio communication mode using the communication link in the first radio communication mode. The operation of maintaining the communication service may comprise switching from the second radio communication mode to a third radio communication mode using the communication link in the first radio communication mode to maintain the communication service in the third radio communication mode.

Figure 16:
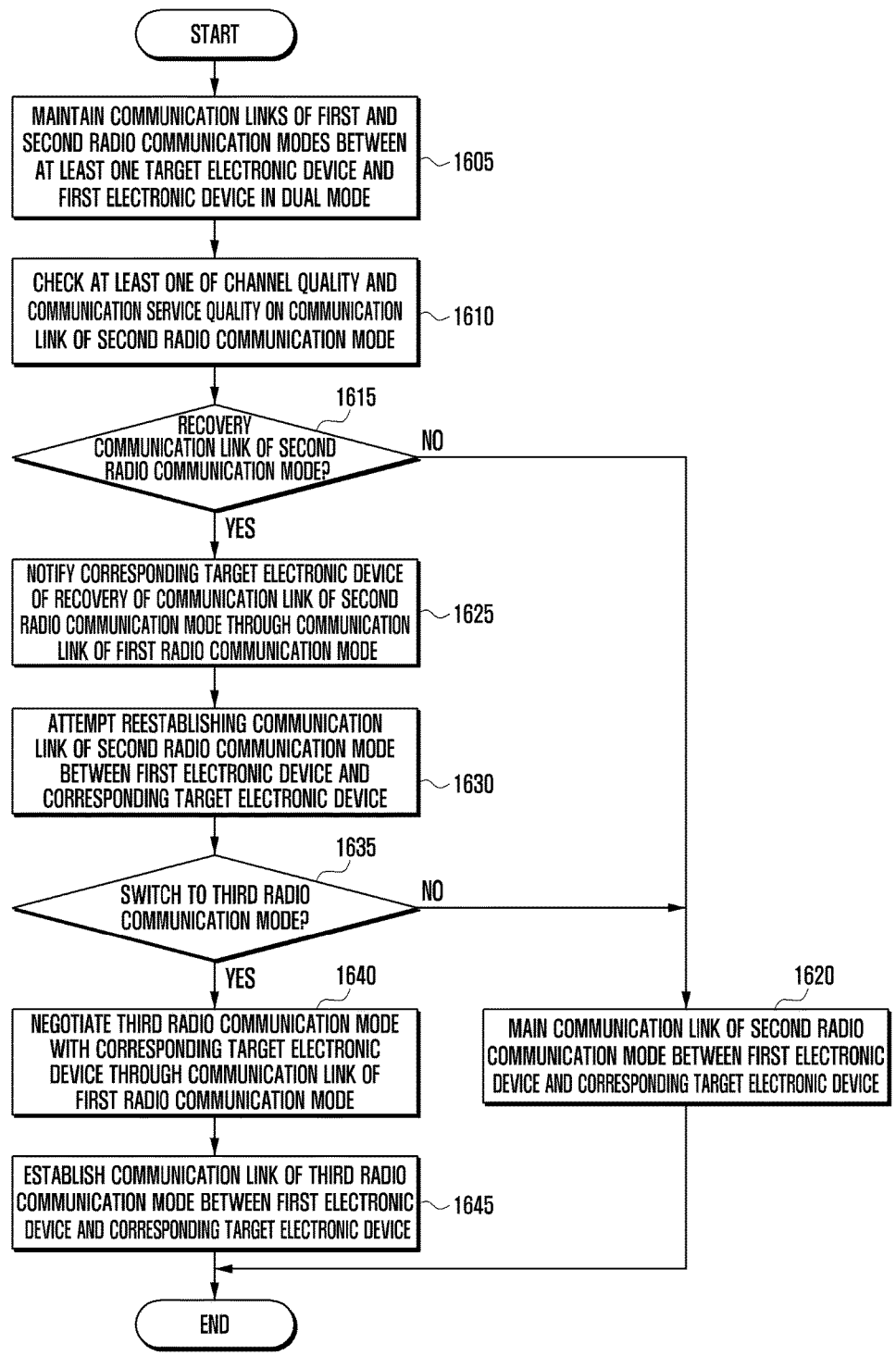
FIG. 16 is a flowchart illustrating an example procedure of operating communication links in accordance with aspects of the present disclosure.

Hereinafter, a more detailed description of a dual mode operation of the first electronic device 100 will be made with reference to FIG. 16.

In order to operate in dual mode, each electronic device may have a dual mode capability. The dual mode capability information may be included in the first and/or second advertising packet. Whether to activate the dual mode may be determined during the negotiation process at operation 1060 of FIG. 10.

The first electronic device 100 may simultaneously maintain communication links in the first and second radio communication mode with at least one other device in accordance with the dual mode at operation 1605.

The first electronic device 100 checks at least one of the channel quality and communication service quality on the communication link in the second radio communication mode at operation 1610. For example, the channel quality may be for example Channel Quality Indicator (CQI), Received Signal Strength Indicator (RSSI), and Signal to Interference plus Noise Ratio (SINR); and the communication service quality may be the response delay time in accordance with the flow control of the frame work. If the response delay time is longer than a predetermined time, this may be interpreted to mean that the communication link is broken.

The first electronic device may determine whether it is necessary to recover the communication link in the second radio communication link at operation 1615. For example, if the communication link with a corresponding target electronic device has been broken, the first electronic device determines the necessity of the recovery of the communication link and thus the procedure goes to operation 1625. In the case that the channel quality or communication service quality of the corresponding communication link is good, the procedure goes to operation 1620 to maintain the communication link in the second radio communication mode between the first electronic device 100 and the corresponding target electronic device 200.

At operation 1625, the first electronic device 100 may notify the corresponding target electronic device that the communication link in the second radio communication mode needs to be recovered through the communication link in the first radio communication mode.

The first electronic device 100 may attempt to establish the communication link in the second radio communication mode with the corresponding target electronic device at operation 1630. For example, the communication link reestablishment may be performed as operations 1510 to 1525 of FIG. 15. In this instance, any operation 1520 of performing the pairing procedure for authentication based on the authentication information or channel information acquired through the previous communication link and operations 1510 and 1515 of receiving the connection request or the response in reply to the connection request may be omitted.

The first electronic device 100 may determine whether it is necessary to switch the communication mode to a third radio communication mode at operation 1635. For example, if the second radio communication mode link reestablishment is successful or if the channel quality on the reestablished second radio communication mode link is good, the procedure goes to operation 1620. Otherwise if the second radio communication mode link reestablishment fails or the channel quality over the reestablished second radio communication mode link does not fulfill a predetermined level, the procedure goes to operation 1640.

At operation 1640, the first electronic device 100 negotiates with the corresponding target electronic device regarding the third radio communication mode for establishing a link with the target electronic device through the first radio communication mode link. The third radio communication mode may be an RF communication mode negotiated among the electronic devices to substitute the second radio communication mode. The third radio communication mode may be one of the second radio communication mode candidates including the current second radio communication mode. The third radio communication mode may be selected automatically when the communication quality of the second radio communication mode used by the first electronic device does not fulfil a predetermined quality level. If the third radio communication mode is automatically selected, the third radio communication mode negotiation procedure of operation 1640 may be omitted.

The first electronic device 100 may establish the communication link in the second radio communication mode with the corresponding target electronic device at operation 1645.

FIG. 17 is a flowchart illustrating an example communication service method of the first electronic device in accordance with aspects of the present disclosure.

The first electronic device 101 may broadcast, in the BLE communication mode, the first advertising packet comprising its identifier, communication service information, and the RF communication mode capability information at operation 1705.

The first electronic device 101 may receive at least one responding advertising packet requesting to join the communication service in the BLE communication mode at operation 1710.

The first electronic device 101 may display a user interface that permits a user to select at least one target electronic device to join in the communication service at operation 1715.

The first electronic device 101 may establish the communication link in an RF communication mode other than the BLE communication mode with at least one other device selected through the user interface at operation 1720.

The first electronic device may communicate over the established communication link at operation 1725.

Figure 18:
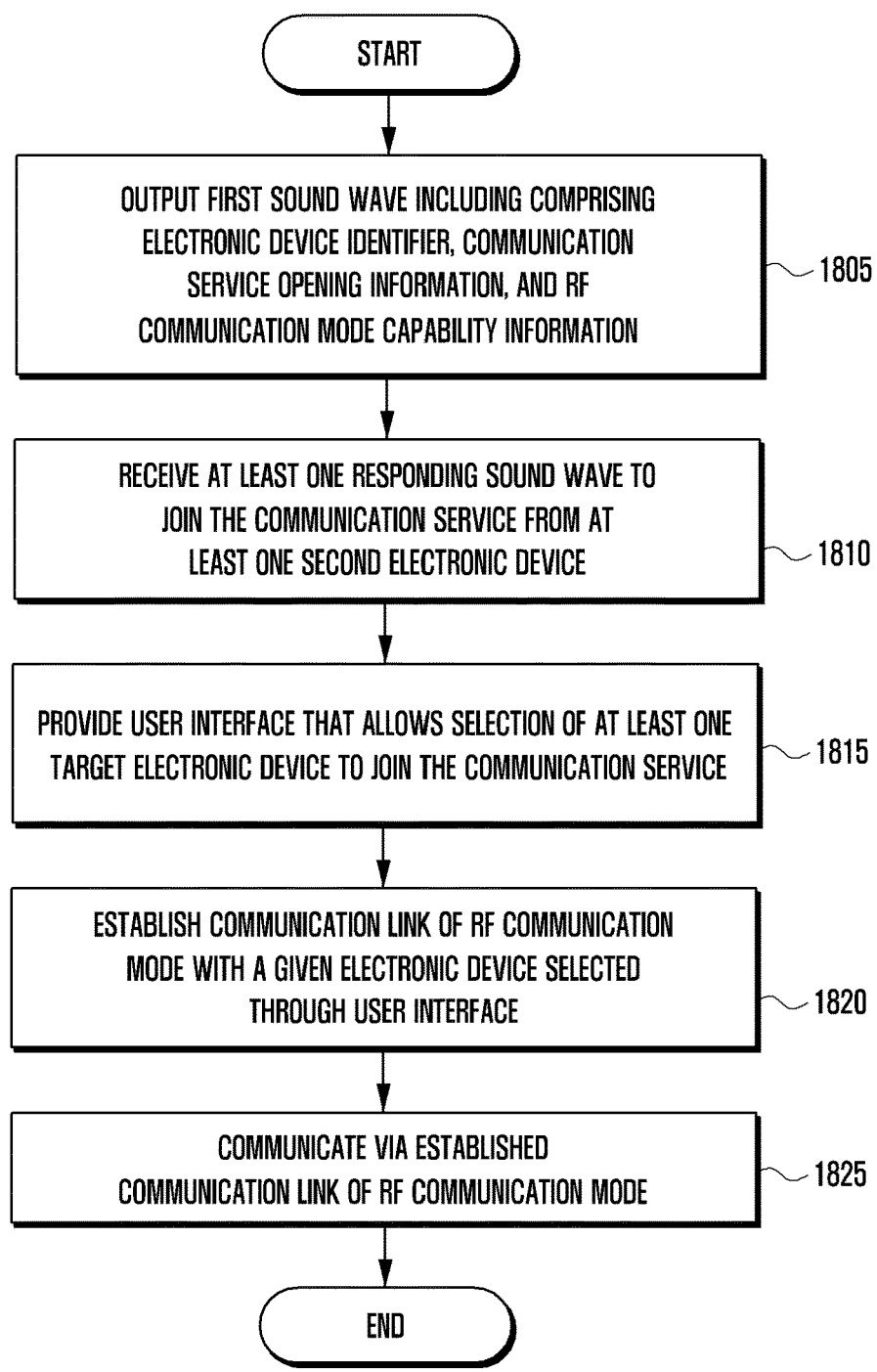
FIG. 18 is a flowchart illustrating an example communication service method of an electronic device in accordance with aspects of the present disclosure.

FIG. 18 is a flowchart illustrating an example communication service method in accordance with aspects of the present disclosure.

The first electronic device 102 may output a first sound wave comprising its identifier, communication service information, and RF communication mode capability information at operation 1805.

The first electronic device 102 may receive at least one responding sound wave requesting to join in the communication service from at least one other electronic device at operation 1810.

The first electronic device 102 may provide a user interface that allows the user to select at least one target electronic device to join in the communication service at operation 1815.

The first electronic device 102 may establish a communication link in the RF communication mode with at least one other device selected through the user interface at operation 1820.

The first electronic device 102 performs communication service on the communication link in the RF communication mode at operation 1825.

It is understood that the user interface described with reference to FIGS. 11 thru 14 are merely illustrative and that the user interface may be implemented in various forms depending on the usage purpose and convenience. For example, the user input displayed in FIG. 11 may be implemented using speech recognition and the information may be output in various forms such as a voice announcement and popup message. The methods of the first or second electronic device disclosed herein may be in a different order and steps may be added or omitted. Also, the operations may be performed in an integrated manner by combining some of the examples described above.

Advantageously, the communication service method and apparatus of the present disclosure is capable of providing a user interface to communicate with at least one other device located within proximity of a first user device. In this regard, a first wireless communication technology module used for initiation may operate at a power level lower than that of a second wireless communication technology module used for actual communication, thereby improving energy consumption efficiency.

Furthermore, the communication service method and apparatus of the present disclosure permits negotiation between the devices using a first wireless communication technology module that is more universal than the second wireless communication technology module, thereby securing compatibility among various devices.

Also, the communication service method and apparatus of the present disclosure is capable of recovering the second wireless communication technology or switching to a third wireless communication technology via the first wireless communication technology, thereby improving communication service quality quickly and efficiently.

The above-described examples of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. § 101.

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

What is claimed is:

1. An electronic device comprising:
   a first communication unit configured to establish a first communication link;
   a second communication unit configured to establish a second communication link and a third communication link, wherein the second communication unit consumes more power than the first communication unit; and
   at least one processor configured to:
      control the first communication unit to broadcast a first advertising packet comprising an identifier of the electronic device and communication service information,
      control the first communication unit to receive an advertising packet response from an external electronic device located near the electronic device, wherein the external electronic device comprises another first communication unit and another second communication unit,
      control the second communication unit to establish a second communication link with the another second communication unit of the external electronic device, and
      control the first communication unit to establish the first communication link with the another first communication unit of the external electronic device, the second communication unit to switch from the second communication link to a third communication link in response to a request for changing a communication method,
   wherein the third communication link uses a different communication method from that of the second communication link, and
   wherein the first communication unit maintains the first communication link during the switching.

2. The electronic device of claim 1, wherein the at least one processor is further configured to control the first communication unit to negotiate with the external electronic device for establishing the second communication link.

3. The electronic device of claim 2, wherein a channel for the negotiating is a secure communication link established between the external electronic device and the electronic device.

4. The electronic device of claim 1, wherein the first advertising packet comprises radio communication capability data associated with the electronic device, and the advertising packet response comprises radio communication capability data associated with the external electronic device based on the first advertising packet.

5. The electronic device of claim 4, wherein the first advertising packet further comprises information on dual mode for establishing the first communication link by the first communication unit during the switching.

6. The electronic device of claim 1, wherein the first advertising packet comprises a field associated with the first, second and third communication link and a Medium Access Control (MAC) address field based on the first, second and third communication link.

7. The electronic device of claim 1, wherein the at least one processor is further configured to control the first communication unit to maintain a communication service using the first communication link.

8. The electronic device of claim 7, wherein the at least one processor is further configured to control the second communication unit to recover the second communication link using the first communication link.

9. The electronic device of claim 1, wherein the first communication unit comprises one of a sound wave communication module and a Bluetooth Low Energy (BLE) module, and the second communication unit comprises one of a wireless fidelity (Wi-Fi) module, and a Wi-Fi Direct module.

10. The electronic device of claim 1, wherein the first advertising packet comprises a service identifier field and a service state field indicating a state of a communication service.

11. The electronic device of claim 1, wherein the first advertising packet comprises a company identifier indicating at least one of a manufacturer of the electronic device and a communication service provider, the company identifier being used for determining which devices can receive the first advertising packet.

12. The electronic device of claim 1, wherein the first advertising packet further comprises a transmission power information for use in calculating pathloss along with Receiver Signal Strength Indicator (RSSI) of the first advertising packet which is measured by the external electronic device.

13. A communication service method comprising:
   broadcasting, by a first communication unit of an electronic device, a first advertising packet comprising an identifier of the electronic device and communication service information;
   receiving, by the first communication unit of the electronic device, an advertising packet response from an external electronic device located near the electronic device, wherein the external electronic device comprises another first communication unit and another second communication unit;
   establishing, by a second communication unit of the electronic device, a second communication link with the another second communication unit of the external electronic device, wherein the second communication unit of the electronic device is configured to consume more power than the first communication unit;
   establishing, by the first communication unit of the electronic device, a first communication link with the another first communication unit of the external electronic device in response to a request for changing a communication method;
   switching, by the second communication unit of the electronic device, from the second communication link to a third communication link, and
   maintaining, by the first communication unit of the electronic device, the third communication link with the external electronic device during the switching,
   wherein the third communication link uses a different communication method from that of the second communication link.

14. The method of claim 13, wherein establishing the second communication link comprises negotiating, by the first communication unit of the electronic device, with the external electronic device.

15. The method of claim 13, wherein the first advertising packet comprises a field associated with the first, second and third communication link and a Medium Access Control (MAC) address field based on the first, second and third communication link.

* * * * *